United States Patent
Zhang et al.

(10) Patent No.: US 12,206,502 B2
(45) Date of Patent: Jan. 21, 2025

(54) METHOD AND APPARATUS FOR GROUP BASED PHYSICAL DOWNLINK SHARED CHANNEL (PDSCH) HYBRID AUTOMATIC REPEAT REQUEST (HARQ)-ACKNOWLEDGEMENT (ACK) FEEDBACK IN WIRELESS COMMUNICATION

(71) Applicant: Apple Inc., Cupertino, CA (US)

(72) Inventors: Yushu Zhang, Beijing (CN); Hong He, Cupertino, CA (US); Dawei Zhang, Cupertino, CA (US); Haitong Sun, Cupertino, CA (US); Jie Cui, Cupertino, CA (US); Manasa Raghavan, Cupertino, CA (US); Wei Zeng, Cupertino, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,276

(22) PCT Filed: Aug. 7, 2020

(86) PCT No.: PCT/CN2020/107833
§ 371 (c)(1),
(2) Date: Sep. 23, 2021

(87) PCT Pub. No.: WO2022/027599
PCT Pub. Date: Feb. 10, 2022

(65) Prior Publication Data
US 2023/0163885 A1    May 25, 2023

(51) Int. Cl.
*H04L 1/1812*    (2023.01)
*H04L 1/00*    (2006.01)
*H04W 72/23*    (2023.01)

(52) U.S. Cl.
CPC .......... *H04L 1/1812* (2013.01); *H04L 1/0061* (2013.01); *H04W 72/23* (2023.01)

(58) Field of Classification Search
CPC ..... H04L 1/1812; H04L 1/0061; H04W 72/23
See application file for complete search history.

(56) References Cited

U.S. PATENT DOCUMENTS

| 6,286,104 B1 | 9/2001 | Buhle et al. |
| 2010/0150089 A1 | 6/2010 | Yu |

(Continued)

FOREIGN PATENT DOCUMENTS

| CN | 105284151 A | 1/2016 |
| CN | 108631964 A | 10/2018 |

(Continued)

OTHER PUBLICATIONS

International Search Report Dated May 7, 2021 for International Application PCT/CN2020/107832.

(Continued)

*Primary Examiner* — Natasha W Cosme
(74) *Attorney, Agent, or Firm* — Eschweiler & Potashnik, LLC

(57) ABSTRACT

A user equipment (UE) is disclosed. The UE comprises a processor configured to perform operations comprising receiving a hybrid automatic repeat request process group (HPG) configuration signal from a base station associated therewith, wherein the HPG configuration signal comprises information of a plurality HARQ process groups (HPGs), each HPG comprising one or more HARQ processes of a set of HARQ processes configured for the UE. The operations further comprise receiving a downlink control information (DCI) from the base station, wherein the DCI comprises information that identifies one or more HPGs of the plurality of HPGs, the HARQ-ACK feedback information of which (Continued)

are to be included in a HARQ-ACK feedback signal that is triggered by the DCI. In addition, the operations comprise generating the HARQ-ACK feedback signal comprising the HARQ-ACK feedback information of HARQ processes associated with the one or more HPGs and sending the HARQ-ACK feedback signal to the base station.

20 Claims, 17 Drawing Sheets

(56) References Cited

U.S. PATENT DOCUMENTS

| | | | |
|---|---|---|---|
| 2010/0254327 A1* | 10/2010 | McBeath | H04L 1/1812 370/329 |
| 2015/0103775 A1 | 4/2015 | Zhu et al. | |
| 2016/0157213 A1 | 6/2016 | Takeda et al. | |
| 2019/0165897 A1 | 5/2019 | Lin | |
| 2020/0084728 A1 | 3/2020 | Park | |
| 2021/0050961 A1 | 2/2021 | Chen Larsson | |
| 2022/0052793 A1 | 2/2022 | Bao | |
| 2022/0103292 A1 | 3/2022 | Hwang | |
| 2022/0303100 A1* | 9/2022 | Yang | H04L 1/1822 |
| 2023/0043308 A1 | 2/2023 | Li et al. | |
| 2023/0091988 A1 | 3/2023 | Li et al. | |
| 2023/0164764 A1 | 5/2023 | Chen et al. | |
| 2023/0239077 A1 | 7/2023 | Gerami | |
| 2023/0261840 A1 | 8/2023 | Wong et al. | |
| 2023/0336314 A1 | 10/2023 | Wong et al. | |

FOREIGN PATENT DOCUMENTS

| | | |
|---|---|---|
| CN | 110958085 A | 4/2020 |
| CN | 111245586 A | 6/2020 |
| CN | 111435901 A | 7/2020 |
| WO | 2010076993 A2 | 8/2010 |
| WO | 2017192025 A1 | 9/2017 |
| WO | 20191374494 A1 | 7/2019 |
| WO | 2020063859 A1 | 2/2020 |
| WO | 2021/163330 A1 | 8/2021 |

OTHER PUBLICATIONS

International Written Opinion Dated May 7, 2021 for International Application PCT/CN2020/107832.
3GPP; "3rd Generation Partnership Project; Technical Specification Group Radio Access Network; NR; Physical Layer"; 3GPP TS 38.213; V16.0.0; Dec. 31, 2019.
3GPP; "5G; NR; Multiplexing and Channel Coding"; 3GPP TS 38.212 Version 16.2.0 (Release 16); ETSI TS 138 212 V16.2.0; Jul. 2020.
3GPP; "5G; NR; Physical Layer Procedures for Control"; 3GPP TS 38.213 Version 16.2.0 (Release 16); ETSI TS 138 213 V16.2.0; Jul. 2020.
3GPP; "5G; NR; Radio Resource Control (RRC); Protocol Specification"; 3GPP TS 38.331 Version 16.1.0 (Release 16); ETSI TS 138 331 V16.1.0; Jul. 2020.
Adlen Ksentini, et al.; "Providing Low Latency Guarantees for Slicing-Ready 5G Systems Via Two-Level MAC Scheduling"; Apr. 24, 2018.
3GPP; "3rd Generation Partnership Project; Technical Specification Group Radio Access Network; NR; Physical Layer Procedures for Control (Release 16)"; 3GPP TS 38.213; V16.1.0; Mar. 2020.
Xiao Wen Li, et al.; "Research and Solution of Semi-Persistent Scheduling Problem in LTE System"; 2011 International Conference on Computer Science and Information Technology (ICCSIT 2011); IPCSIT vol. 51 (2021).
Libby Allen; "It's A Big Aspect of 5G but What is URLLC?"; https://www.rcrwireless.com/20190107/5g/what-is-urllc; Jan. 7, 2019.
"VoLTE: Semi-Persistent Scheduling (SPS) and TTI Bundling"; https://blog.3g4g.co.uk/2011/02/volte-semi-persistent-scheduling-sps.html; Feb. 8, 2011.
"5G/NR—Scheduling"; www.sharetechnote.com/html/5G/5G_Scheduling.html; Aug. 6, 2020.
"Hybrid Automatic Repeat Request (HARQ) in LTE FDD"; Techplayon; https://www.techplayon.com/hybrid-automatic-repeat-request-harq-in-lte-fdd/; Oct. 18, 2018.
"How LTE Stuff Works?: LTE: Semi-Persistent Scheduling"; http://www.howltestuffworks.blogspot.com/2013/10/semi-persistent-scheduling.html; 2013.
"LTE Basic Procedure"; https://www.sharetechnote.com/html/BasicProcedure_LTE_HARQ.html; Aug. 6, 2020.
International Search Report Dated Apr. 25, 2021 for International Application PCT/CN2020/107833.
International Written Opinion Dated Apr. 25, 2021 for International Application PCT/CN2020/107833.
U.S. Appl. No. 17/442,294, filed with the USPTO Sep. 23, 2021.
International Preliminary Report on Patentability dated Feb. 16, 2023in connection with Application Serial No. PCT/CN2020/107833.
International Preliminary Report on Patentability dated Feb. 7, 2023 in connection with Application Serial No. PCT/CN2020/107831.
3GPP; 5G; NR; Multiplexing and channel coding (3GPP TS 38.212 version 15.9.0 Release 15); ETSI TS 138 212 V15.9.0; Jul. 2020.
3GPP; 5G; NR; Physical layer procedures for control (3GPP TS 38.213 version 15.10.0 Release 15); ETSI TS 138 213 V15.10.0; Jul. 2020.
3GPP; 5G; NR; Radio Resource Control (RRC); Protocol specification (3GPP TS 38.331 version 15.10.0 Release 15); ETSI TS 138 331 V15.10.0; Jul. 2020.
Non-Final Office Action dated May 22, 2024 in connection with U.S. Appl. No. 17/442,294.
Chinese Office Action dated Jun. 28, 2024 for Chinese Application No. 2020801039924.
Huawei; Feature lead summary#2 of HARQ enhancements for NR-U; Discussion and Decision; 7.2.2.2.3; 3GPP TSG RAN WG1 Meeting #98bis; R1-1911618; Chongqing, China, Oct. 14-20, 2019.
European Extended Search Report dated Mar. 21, 2024, for EP Application No. 20948681.
Huawei: "Feature lead summary #2 of HARQ enhancements for NR-U"; 3GPP Draft; RI-1911618; vol. RAN WG1; Oct. 22, 2019.
Notice of Allowance dated Apr. 8, 2024 in connection with U.S. Appl. No. 17/441,351.
Non-Final Office Action dated Dec. 21, 2023, for U.S. Appl. No. 17/441,351.
Notice of Allowance dated Nov. 26, 2024 in connection with U.S. Appl. No. 17/442,294.

* cited by examiner

```
HARQProcess-Config-r16 ::= SEQUENCE {
    HARQProcessGroup0-r16          BIT STRING (SIZE (X)),
    HARQProcessGroup1-r16          BIT STRING (SIZE (X)),
    HARQProcessGroup2-r16          BIT STRING (SIZE (X)),
    ...
}
```

FIG. 3a

```
HARQProcess-Config-r16 ::= SEQUENCE {
    PriorityList0-r16              BIT STRING (SIZE (X)),
    PriorityList1-r16              BIT STRING (SIZE (X)),
    ...
}
```

METHOD AND APPARATUS FOR GROUP BASED PHYSICAL DOWNLINK SHARED CHANNEL (PDSCH) HYBRID AUTOMATIC REPEAT REQUEST (HARQ)-ACKNOWLEDGEMENT (ACK) FEEDBACK IN WIRELESS COMMUNICATION

REFERENCE TO RELATED APPLICATIONS

This application is a National Phase entry application of International Patent Application No. PCT/CN2020/107833 filed Aug. 7, 2020, entitled "METHOD AND APPARATUS FOR GROUP BASED PHYSICAL DOWNLINK SHARED CHANNEL (PDSCH) HYBRID AUTOMATIC REPEAT REQUEST (HARQ)-ACKNOWLEDGEMENT (ACK) FEEDBACK IN WIRELESS COMMUNICATION", the contents of which are herein incorporated by reference in their entirety.

FIELD

The present disclosure relates to the field of wireless communication systems, and in particular, to a system and method for group based physical downlink shared channel (PDSCH) hybrid automatic repeat request (HARQ)-acknowledgement (ACK) feedback in wireless communication.

BACKGROUND

Networks need to provide data quickly and reliably without taxing their resources. Hybrid automatic repeat request (HARQ) technology can make that happen. HARQ uses a stop and wait protocol. When a transmission has been made, the transmitting entity stops and waits until it receives an acknowledgement (ACK) or negative acknowledgement (NACK) back from the destination before transmitting the next block of data or retransmitting the same data block. Such transmission/reception processes that relies on ACK/NACK feedback are sometimes referred to as HARQ processes.

BRIEF DESCRIPTION OF THE DRAWINGS

Some examples of circuits, apparatuses and/or methods will be described in the following by way of example only. In this context, reference will be made to the accompanying Figures.

FIG. 2b and FIG. 2c illustrates HARQ process grouping for HARQ feedback, according to one embodiment of the disclosure.

FIG. 3a and FIG. 3b depicts two possible signal configurations for the HPG configuration signal, according to one embodiment of the disclosure.

FIG. 4a ad FIG. 4b illustrates two possible configurations of a HARQ regroup MAC CE, according to one embodiment of the disclosure.

DETAILED DESCRIPTION

Figure 1:
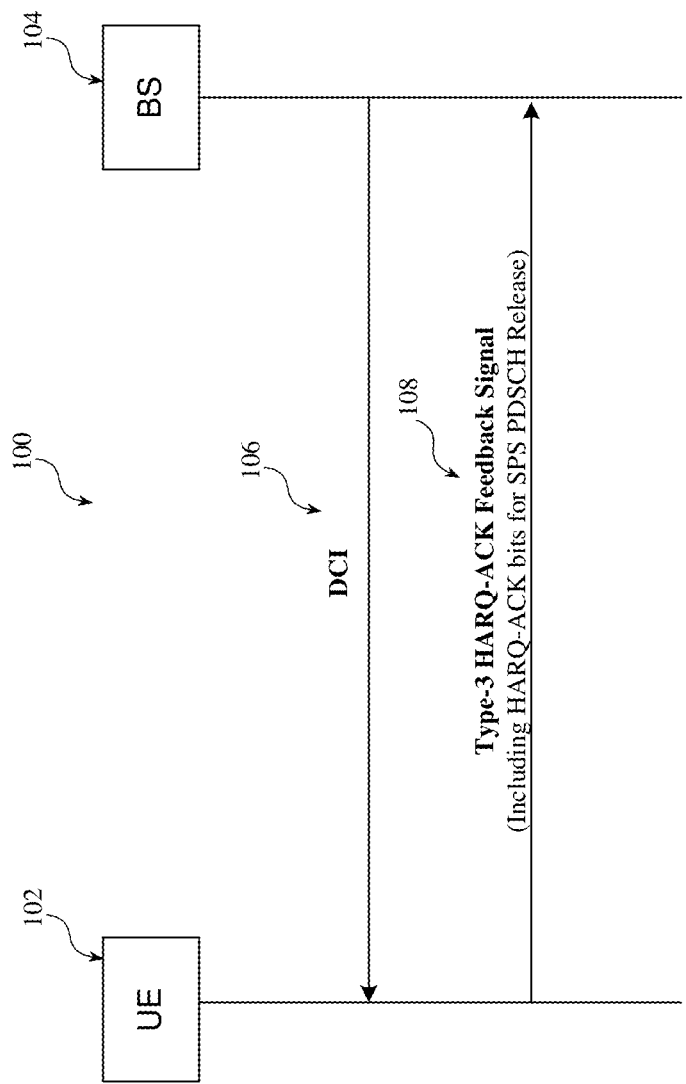
FIG. 1 illustrates a simplified block diagram of a wireless communication system supports SPS release together with Type-3 HARQ-ACK codebook configuration, according to one embodiment of the disclosure.

In one embodiment of the disclosure, a user equipment (UE) is disclosed. The UE comprises a processor (or processing circuitry) configured to perform operations comprising receiving a hybrid automatic repeat request process group (HPG) configuration signal from a base station associated therewith. In some embodiments, the HPG configuration signal comprises information of a plurality HARQ process groups (HPGs), each HPG comprising one or more HARQ processes of a set of HARQ processes configured for the UE. The operation further comprises determining the plurality of HPGs associated with the set of HARQ processes configured for the UE, based on processing the HPG configuration signal and receiving a downlink control information (DCI) from the base station. In some embodiments, the DCI is configured to trigger a HARQ-ACK feedback signal from the UE and the DCI comprises information that identifies one or more HPGs of the plurality of HPGs, the HARQ-ACK feedback information of which are to be included in the HARQ-ACK feedback signal. In addition, the operations comprise generating the HARQ-ACK feedback signal comprising the HARQ-ACK feedback information of HARQ processes associated with the one or more HPGs; and sending the HARQ-ACK feedback signal to the base station.

In one embodiment of the disclosure, a base station (BS) is disclosed. The BS comprises a processor (or processing circuitry) configured to perform operations comprising sending a hybrid automatic repeat request process group (HPG) configuration signal to a user equipment (UE) associated therewith. In some embodiments, the HPG configuration signal comprises information of a plurality HARQ process groups (HPGs), each HPG comprising one or more HARQ processes of a set of HARQ processes configured for the UE. The operations further comprise sending a downlink control information (DCI) to the UE. In some embodiments, the DCI is configured to trigger a HARQ-ACK feedback signal from the UE and the DCI comprises information that identifies one or more HPGs of the plurality of HPGs, HARQ-ACK feedback information of which are to be included in the HARQ-ACK feedback signal. In addition, the operations comprise receiving the HARQ-ACK feedback signal from the UE. In some embodiments, the HARQ-ACK feedback signal comprises the HARQ-ACK feedback information of HARQ processes associated with the one or more HPGs.

In one embodiment of the disclosure, a baseband (BB) processor for a user equipment (UE) is disclosed. The BB processor is configured to perform operations comprising receiving a hybrid automatic repeat request process group (HPG) configuration signal from a base station associated therewith. In some embodiments, the HPG configuration signal comprises information of a plurality HARQ process groups (HPGs), each HPG comprising one or more HARQ processes of a set of HARQ processes configured for the UE. The operations further comprise determining the plurality of HPGs associated with the set of HARQ processes configured for the UE, based on processing the HPG configuration signal. Furthermore, the operations comprise receiving a downlink control information (DCI) from the base station. In some embodiments, the DCI is configured to trigger a HARQ-ACK feedback signal from the UE and the DCI comprises information that identifies one or more HPGs of the plurality of HPGs, the HARQ-ACK feedback information of which are to be included in the HARQ-ACK feedback signal. In addition, the operations comprise generating the HARQ-ACK feedback signal comprising the HARQ-ACK feedback information of HARQ processes associated with the one or more HPGs; and sending the HARQ-ACK feedback signal to the base station.

In one embodiment of the disclosure, a baseband (BB) processor for a base station (BS) is disclosed. The BB processor is configured to perform operations comprising sending a hybrid automatic repeat request process group (HPG) configuration signal to a user equipment (UE) associated therewith. In some embodiments, the HPG configuration signal comprises information of a plurality HARQ process groups (HPGs), each HPG comprising one or more HARQ processes of a set of HARQ processes configured for the UE. The operations further comprise sending a downlink control information (DCI) to the UE. In some embodiments, the DCI is configured to trigger a HARQ-ACK feedback signal from the UE and the DCI comprises information that identifies one or more HPGs of the plurality of HPGs, HARQ-ACK feedback information of which are to be included in the HARQ-ACK feedback signal. In addition, the operations comprise receiving the HARQ-ACK feedback signal from the UE. In some embodiments, the HARQ-ACK feedback signal comprises the HARQ-ACK feedback information of HARQ processes associated with the one or more HPGs.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As indicated above, HARQ process relies upon receiving ACK/NACK for the data packets. When a base station (BS) sends data/transmission to a user equipment (UE) through physical downlink shared channel (PDSCH), the UE determines it's correctness by checking cyclic redundancy check (CRC) and report it to base station through ACK/NACK bit. If the UE also has data to send and it gets a grant, it'll send ACK/NACK on physical uplink shared channel (PUSCH) along with data, otherwise it'll send it on physical uplink control channel (PUCCH). A HARQ-ACK codebook defines the format used to signal a set of HARQ acknowledgements (ACKs) to the base station. The codebook allows the UE to multiplex the HARQ ACKs from multiple slots, multiple carriers, multiple transport blocks and multiple code block groups (CBGs) within a single transmission. It is important that both UE and base station share the same understanding of the codebook format to ensure that each acknowledgement is linked to the appropriate transmission. The base station configures the use of a specific codebook category using the pdsch-HARQ-ACK-Codebook information element via radio resource control signaling. Different categories of HARQ-ACK codebooks are defined in 3GPP. For example, a Type-1 HARQ-ACK codebook comprising a semi-static codebook where the size of the codebook is fixed by information provided by radio resource control (RRC) signaling and a Type-2 HARQ-ACK codebook comprising a dynamic codebook where the size of the codebook changes according to the number of resource allocations. Further, a Type-3 HARQ-ACK codebook is defined that is triggered on demand by a one-shot HARQ-ACK frequent field in the DCI.

There are two types of scheduling for downlink. One is called 'Dynamic Scheduling' and the other one Semi Persistent Scheduling (SPS). Dynamic scheduling is the mechanism in which each and every PDSCH is scheduled by DCI (e.g., DCI 1_0 or DCI 1_1). SPS is the mechanism in which the PDSCH transmission is configured by radio resource control (RRC) message. SPS is a feature that significantly reduces control channel overhead for applications that require persistent radio resource allocations such as VoIP. In dynamic scheduling, both the downlink (DL) and uplink (UL) are fully scheduled since the DL and UL traffic channels are dynamically shared channels. This means that the physical DL control channel (PDCCH) must provide access grant information to indicate which users should decode the physical DL shared channel (PDSCH) in each subframe and which users are allowed to transmit on the physical UL shared channel (PUSCH) in each subframe. Without SPS, every DL or UL physical resource block (PRB) allocation must be granted via an access grant message on the PDCCH. This is sufficient for most bursty best effort types of applications which generally have large packet sizes and thus typically only a few users must be scheduled each subframe. However, for applications that require persistent allocations of small packets (i.e. VoIP), the access grant control channel overhead can be greatly reduced with SPS. Once the SPS is configured by an RRC message, the base station activates the SPS using downlink control information (DCI) of PDCCH. Upon activation of SPS, transmission of SPS in UL and DL is performed. As SPS activation, SPS release or SPS PDSCH release is also indicated by the DCI, in some embodiments. Alternately, in other embodiments, the SPS release may be indicated to the UE via RRC signaling or higher layer signaling.

Latest wireless communication technologies like 5G are expected to support a broad range of newly emerging applications on top of the regular cellular mobile broadband services. One of the key usage scenarios in the scope of 5G is ultra-reliable and low-latency communications (URLLC). URLLC will play an essential role in providing connectivity for the new services and applications from vertical domains, such as factory automation, autonomous driving and so on. The most important key performance indicators (KPIs) related to URLLC are latency, reliability and availability. SPS-based PDSCH transmission is widely used for URLLC service type to reduce signaling overhead and improve the reliability. For example, up to 8 DL SPS configurations is supported for a given BWP of a serving cell. In addition, joint release in a DCI for two or more SPS configurations is supported by means of M least significant bit (LSB) HARQ process number (HPN) bits to minimize the signaling overhead.

In current implementations, a Type-3 HARQ-ACK codebook does not support HARQ-ACK feedback for SPS release. Specifically, when the Type-3 HARQ-ACK codebook is triggered in a same slot when the SPS release indication is provided by the BS to the UE, the HARQ-ACK information corresponding to the SPS release will be dropped, as the Type-3 HARQ-ACK codebook does not support HARQ-ACK feedback for SPS release. This greatly affects the reliability of URLLC services when the URLLC services utilized SPS based PDSCH transmission. Therefore, enhancement to support of SPS release together with Type-3 HARQ-ACK codebook configuration is important to efficiently operate URLLC traffic on unlicensed band in controlled environment. Disclosed herein are systems, circuitries, and techniques for that supports SPS release together with Type-3 HARQ-ACK codebook configuration.

Further, in current implementations, HARQ-ACK information for multiple DL HARQ processes configured for the UE is included in the HARQ-ACK codebooks. For example, the HARQ-ACK information for all DL HARQ processes configured for the UE are included in the Type-3 HARQ-ACK codebook. However, this affects the reliability of HARQ-ACK feedback for high reliability services like URLLC services, when one or more of the DL HARQ processes configured for the UE includes URLLC services. In order to overcome this disadvantage, disclosed herein are systems, circuitries, and techniques that provide a flexible procedure to control HARQ-ACK codebooks based on grouping HARQ processes to improve reliability, for example, to meet the reliability requirement of URLLC service types.

FIG. 1 illustrates a simplified block diagram of a wireless communication system 100, according to one embodiment of the disclosure. In some embodiments, the wireless communication system 100 supports SPS release together with Type-3 HARQ-ACK codebook configuration. The wireless communication system 100 comprises a user equipment (UE) 102 and a base station (BS) 104. In other embodiments, however, the wireless communication system 100 can comprise a plurality of UEs and is not shown here for clarity purposes. In some embodiments, base station 104 is equivalent to an eNodeB in LTE systems, gNodeB in 5G new radio (NR) systems etc. In some embodiments, the UE 102 may comprise a mobile phone, tablet computer, an internet of things (IoT) device, a vehicle-to-everything (V2X) UE, etc. The UE 102 and the base station 104 are configured to communicate with one another over a communication medium (e.g., air). In some embodiments, the wireless communication system 100 supports semi-persistent scheduling (SPS) release together with Type-3 HARQ-ACK codebook configuration, as can be fully appreciated below.

In some embodiments, the BS 104 is configured to provide a downlink control information (DCI) 106 to the UE 102. The DCI 106 is provided to the UE 102 as part of a physical downlink control channel (PDCCH). In some embodiments, the DCI 106 is configured to trigger a Type-3 hybrid automatic repeat request (HARQ) ACK feedback signal 108 from the UE 102. In such embodiments, the DCI 106 comprises an indication to trigger the Type-3 HARQ ACK feedback signal 108. Specifically, the DCI 106 comprises a one-shot HARQ-ACK frequent field, a value associated therewith providing an indication to the UE 102 to trigger the Type-3 HARQ-ACK feedback signal 108. For example, when the one-shot HARQ-ACK frequent field comprises a value of 1, the UE 102 is configured to trigger the Type-3 HARQ-ACK feedback signal 108. Alternately, when the one-shot HARQ-ACK frequent field comprises a value of 0, the UE 102 is configured not to trigger the Type-3 HARQ-ACK feedback signal 108. In some embodiments, the DCI 106 further comprises information of physical uplink control channel (PUCCH)/physical uplink shared channel (PUSCH) resources to be utilized by the UE 102 for the transmission of the Type-3 HARQ-ACK feedback signal 108.

The UE 102 is configured to receive and process the DCI 106. Upon processing the DCI 106, when the DCI 106 comprises the indication to trigger a Type-3 HARQ-ACK feedback signal, the UE 102 is configured to generate a Type-3 HARQ-ACK feedback signal 108. In some embodiments, the Type-3 HARQ-ACK feedback signal 108 may further be referred to as Type-3 HARQ-ACK CB 108 or Type-3 HARQ-ACK CB feedback signal 108. In some embodiments, the Type-3 HARQ-ACK feedback signal 108 is configured to include HARQ-ACK information associated with a set of HARQ processes that are configured for the UE 102. In some embodiments, the set of HARQ processes configured for the UE 102 may comprise one or more SPS PDSCHs. In some embodiments, the Type-3 HARQ-ACK feedback signal 108 further includes one or more HARQ-ACK bits for SPS PDSCH release(s). In some embodiments, each of the one or more HARQ-ACK bits for SPS PDSCH release(s) is adapted to include HARQ-ACK information for an SPS PDSCH release associated with the one or more SPS PDSCHs. In some embodiments, the UE 102 is further configured to determine whether the Type-3 HARQ-ACK feedback signal 108 triggered by the DCI 106 and HARQ-ACK information associated with an SPS release are to be send to the base station 104 at a same slot, prior to generating the Type-3 HARQ ACK feedback signal 108. In such embodiments, the UE 102 is further configured to include the HARQ-ACK information corresponding to the SPS release in a HARQ-ACK bit of the one or more HARQ-ACK bits for SPS PDSCH release(s) within the Type-3 HARQ-ACK feedback signal 108.

More particularly, in the embodiments where the UE 102 is configured with one or more SPS PDSCHs, when an SPS PDSCH release indication for a select SPS PDSCH of the one or more SPS PDSCHs is received at the UE 102 or when a select SPS PDSCH of the one or more SPS PDSCHs is released, and it is determined that the UE 102 is to send the HARQ-ACK information for the select SPS PDSCH release in a same slot when the Type-3 HARQ-ACK feedback signal 108 is triggered, the UE 102 is configured to provide HARQ-ACK information for the SPS PDSCH release in a HARQ-ACK bit of the one or more HARQ-ACK bits for SPS PDSCH release(s) within the Type-3 HARQ-ACK feedback signal 108. In some embodiments, the UE 102 is configured to receive an indication to release an SPS PDSCH within the DCI 106. Alternately, in other embodiments, the UE 102 is configured to receive the indication to release the SPS PDSCH via radio resource control (RRC) signaling. Upon generating the Type-3 HARQ-ACK feedback signal 108, the UE 102 is further configured to provide the Type-3 HARQ-ACK feedback signal 108 to the BS 104. The BS 204 is configured to receive and process the Type-3 HARQ-ACK feedback signal 108.

In some embodiments, the one or more HARQ-ACK bits for SPS PDSCH release(s) within the Type-3 HARQ-ACK feedback signal 108 comprises one or more reserved bits for SPS PDSCH release(s) that are reserved to include HARQ-ACK information for one or more SPS PDSCH release(s), respectively. In such embodiments, no information other than HARQ-ACK information for SPS PDSCH release(s) may be included within the one or more reserved bits for SPS PDSCH release(s). In some embodiments, the one or more reserved bits for SPS PDSCH release(s) are appended at the end of the Type-3 HARQ-ACK feedback signal 108. Alternately, in other embodiments, one or more reserved bits for SPS PDSCH release(s) are appended at the start of the Type-3 HARQ-ACK feedback signal 108. In some embodiments, the position/location where the one or more reserved bits for SPS PDSCH release(s) are to be appended is preconfigured and provided to the UE 102 via higher layer signaling.

In some embodiments, the number of reserved bits comprising the one or more reserved bits for SPS PDSCH release(s) that are to be included in the Type-3 HARQ-ACK feedback signal 108 is indicated to the UE 102 by the BS 104. In some embodiments, the BS 104 is configured to provide the indication of the number of reserved bits comprising the one or more reserved bits for SPS PDSCH release(s) via the DCI 106 (e.g., DCI format 1_1, DCI format 1_2 etc.). In some embodiments, the BS 104 is configured to directly provide the number of reserved bits comprising the one or more reserved bits for SPS PDSCH release(s) via the DCI 106. In other embodiments, the DCI 106 includes a total SPS release indicator (T-SRI) field (i.e., a dedicated filed) comprising information that enables to identify a total number of reserved bits comprising the one or more reserved bits for SPS PDSCH release(s) that are to be included within the Type-3 HARQ ACK feedback signal 108.

Specifically, in one embodiment, the T-SRI field comprises a 1-bit field comprising a 1-bit SPS release indicator value that indicates whether reserved bits for SPS PDSCH release(s) are included in Type-3 HARQ ACK feedback signal 108 or not. For example, "1" for the SPS release indicator value means that reserved bits for SPS PDSCH release(s) are present in Type-3 HARQ ACK feedback signal 108 and "0" for the SPS release indicator value means that reserved bits for SPS PDSCH release(s) are not present in Type-3 HARQ ACK feedback signal 108. If SPS release indicator value within the T-SRI field indicates that the reserved bits for SPS PDSCH release(s) are present, the UE 102 is configured to determine the total number of reserved bits based on a total number of HARQ processes for downlink (DL) SPS configured for the UE. For example, if the total number of HARQ processes for DL SPS configured for the UE is 2, then total number of reserved bits is 2 and if the total number of HARQ processes for DL SPS configured for the UE is 4, then total number of reserved bits is 4, and so on.

Alternately, in another embodiment, the T-SRI field comprises a 2-bit field comprising a 2-bit SPS release indicator value that identifies the total number of reserved bits for SPS PDSCH release(s). In some embodiments, the 2-bit SPS release indicator value identifies the total number of reserved bits for SPS PDSCH release(s), in accordance with a predefined mapping between the 2-bit SPS release indicator value and the total number of reserved bits for SPS PDSCH release(s), as shown in the Table 1 below.

TABLE 1

Predefined mapping between the 2-bit T-SRI field and the total number of reserved bits for SPS PDSCH release(s)

| T-SRI Field | Number of reserved bits for SPS PDSCH release(s) |
|---|---|
| 0, 0 | 1 or 5 or 9 or 13 |
| 0, 1 | 2 or 6 or 10 or 14 |
| 1, 0 | 3 or 7 or 11 or 15 |
| 1, 1 | 0 or 4 or 8 or 12 |

Table 1 indicates a one to many mapping between the 2-bit SPS release indicator value and the total number of reserved bits for SPS PDSCH release(s). Specifically, each value of the T-SRI field is associated with multiple values of the number of reserved bits. In some embodiments, the UE 102 is configured to determine a select value of the number of reserved bits from the multiple values of the number of reserved bits, for a 2-bit SPS release indicator value (within the T-SRI field) based on a total number of HARQ processes for DL SPS configured for the UE and in some embodiments, further based on an actual number of received SRS PDSCH release indications at the UE 102. In some embodiments, the total number of reserved bits for SPS PDSCH release(s) is chosen to be less than or equal to the total number of HARQ processes for DL SPS configured for the UE. Referring to Table 1, in one example embodiment, if the T-SRI field comprises 0,1 and the total number of HARQ processes for DL SPS configured for the UE is 4, then the number of reserved bits is chosen to be 2. However, if the T-SRI field comprises 0,1 and the total number of HARQ processes for DL SPS configured for the UE 102 is 8, then the number of reserved bits could be 2 or 6, based on Table 1. In such embodiments, if the actual number of received SRS PDSCH release indications at the UE 102 is 4, then the number of reserved bits is chosen to be 6.

Appending reserved bits for SPS PDSCH release to the Type-3 HARQ-ACK feedback signal 108, as explained above, increases the HARQ-ACK payload of the Type-3 HARQ-ACK feedback signal 108. Therefore, in some embodiments, the one or more HARQ-ACK bits for SPS PDSCH release(s) are included within the Type-3 HARQ-ACK feedback signal 108 without appending additional bits. For example, in one embodiment, the one or more HARQ-ACK bits for SPS PDSCH release(s) within the Type-3 HARQ-ACK feedback signal 108 corresponds to bit positions associated with HARQ processes of the corresponding SPS PDSCH within the Type-3 HARQ-ACK feedback signal 108. More particularly, when the UE 102 is configured with a set of HARQ processes for DL SPS, the Type-3 HARQ-ACK feedback signal 108 comprises a set of bit positions configured to convey HARQ-ACK information for a set of SPS PDSCHs, respectively associated therewith. In some embodiments, HARQ-ACK bits for SPS PDSCH release(s) for the set of SPS PDSCHs are respectively mapped to the bit positions associated with the set of SPS PDSCHs. In another embodiment, the one or more HARQ-ACK bits for SPS PDSCH release(s) within the Type-3 HARQ-ACK feedback signal 108 corresponds to bit positions respectively associated with one or more HARQ processes, each of which is identified by a respective HARQ process identifier (HPI). In some embodiments, the HPI associated with one or more HARQ processes, the bit positions of which are to be utilized for providing HARQ-ACK information for SPS PDSCH release, are indicated to the UE 202 by radio resource control (RRC) signaling.

Figure 2A:
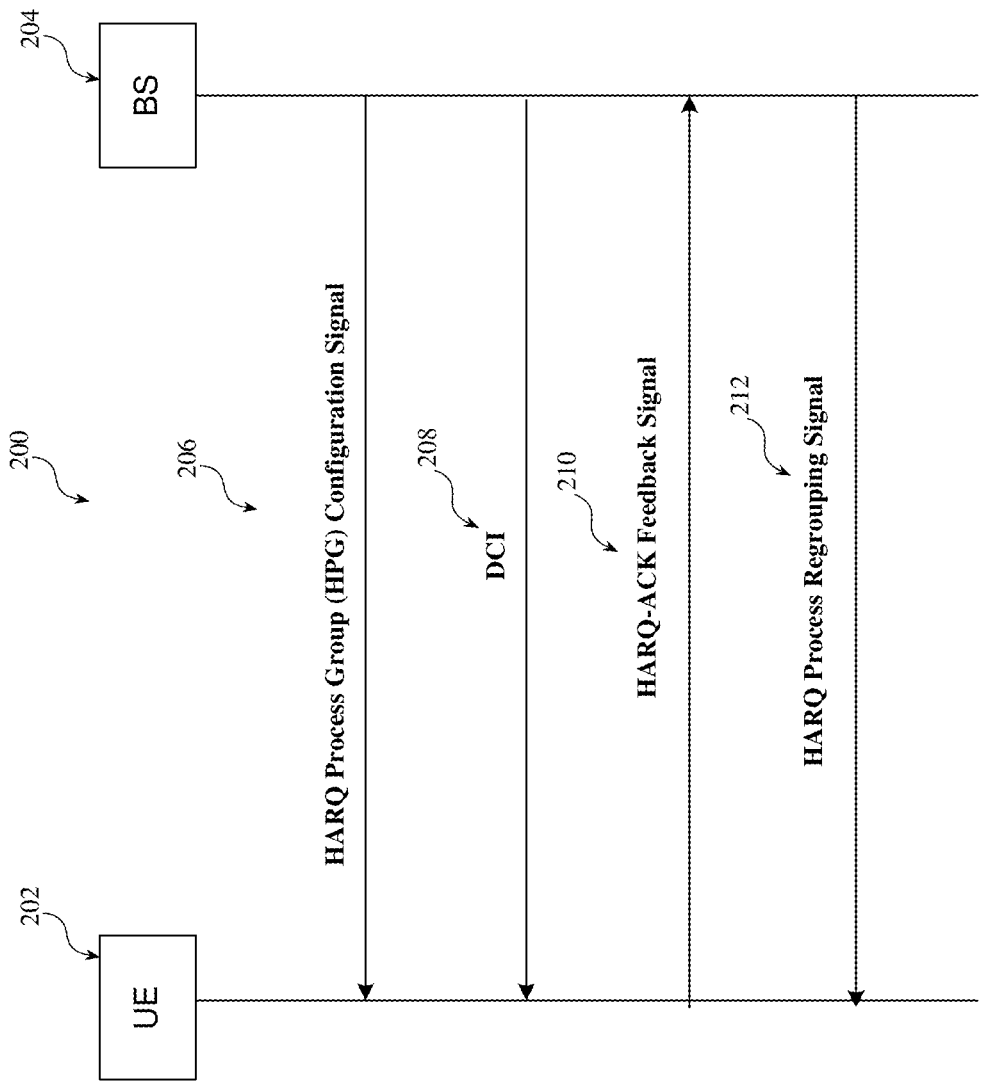
FIG. 2a illustrates a simplified block diagram of a wireless communication system that supports group-based HARQ-ACK feedback, according to one embodiment of the disclosure.

FIG. 2a illustrates a simplified block diagram of a wireless communication system 200, according to one embodiment of the disclosure. In some embodiments, the wireless communication system 200 supports group-based HARQ-ACK feedback. The wireless communication system 200 comprises a user equipment (UE) 202 and a base station (BS) 204. In other embodiments, however, the wireless communication system 200 can comprise a plurality of UEs and is not shown here for clarity purposes. In some embodiments, base station 204 is equivalent to an eNodeB in LTE systems, gNodeB in 5G new radio (NR) systems etc. In some embodiments, the UE 202 may comprise a mobile phone, tablet computer, an internet of things (IoT) device, a vehicle-to-everything (V2X) UE, etc. The UE 202 and the base station 204 are configured to communicate with one another over a communication medium (e.g., air).

Figures 2B, 2C:
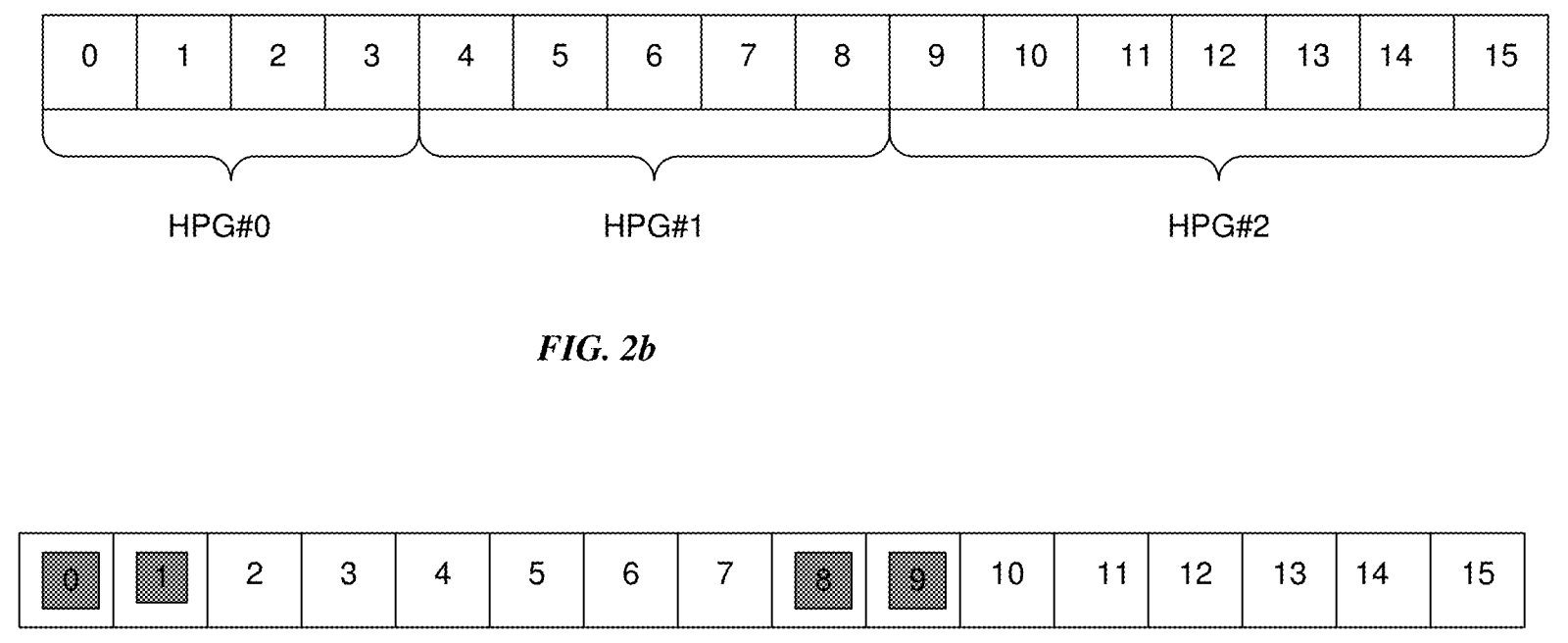

In some embodiments, the BS 204 is configured to configure a set of HARQ processes for the UE 202. In some embodiments, each HARQ process of the set of HARQ processes is identified by a respective HARQ process identifier (HPI). In some embodiments, the BS 204 is further configured to group the set of HARQ processes into a plurality of HARQ process groups (HPGs). In some embodiments, each HPG of the plurality of HPGs comprises one or more HARQ processes of the set of HARQ processes configured for the UE 202. For example, FIG. 2b illustrates a set of 16 HARQ processes identified by HP's 0 to 15. Further, the 16 HARQ processes are grouped into 3 HPGs, HPG #0, HPG #1 and HPG #3. The HP's included within each HPG and number of HPGs configured may be different in different embodiments. In some embodiments, the set of HARQ processes are grouped to form the plurality of HPGs in accordance with a reliability requirement of the associated service types. For example, the HPG #0 includes HPI 0/1/2/3 which may be intended to be utilized for ultra-reliable and low-latency communications (URLLC) with highest reliability requirement. Similarly, HPG #1 and HPG #2 may be associated with other reliability requirements. In some embodiments, each HPG may be restricted for dataflows or logical channel IDs having a same priority.

Further, in some embodiments, the set of HARQ processes may be grouped to form the plurality of HPGs based on a priority class assigned to each HARQ process of the set of HARQ processes associated with the UE, as illustrated in FIG. 2c. In such embodiments, each HPG is associated with a respective priority class index. In some embodiments, the priority class index of an HPG corresponds to the priority class index associated with the one or more HARQ processes within the HPG. For example, the HPI 0/1/8/9 have a same priority class, say priority class index 0 and are grouped into one HPG with a priority class index 0. Similarly, the HPI 2/3/4/5/6/7/10/11/12/13/14/15 have a same priority class, say priority class index 1 and are grouped into another HPG with a priority class index 1. Furthermore, other different criteria for grouping the set of HARQ processes to form the plurality of HPGs are also contemplated to be within the scope of this disclosure. In some embodiments, each HPG of the plurality of HPGs is identified by an HPG identifier (ID). In the embodiments where the grouping is based on priority class, the HPG ID may comprise a corresponding priority class index.

Upon configuring the set of HARQ processes into the plurality of HPGs, the BS 204 is configured to generate an HPG configuration signal 206. In some embodiments, the HPG configuration signal 206 comprises information of the plurality HARQ process groups (HPGs) configured for the UE 202. The BS 204 is further configured to send the HPG configuration signal 206 to the UE 202. FIG. 3a and FIG. 3b depicts two possible signal configurations for the HPG configuration signal 206. Specifically, in FIG. 3a, the plurality of HPGs and the HARQ processes associated therewith are indicated using a respective plurality of HARQProcessGroup fields. In some embodiments, the field HARQProcessGroup identifies an HPG ID and indicates which HARQ processes are included in the HARQ process group (HPG). Each HARQProcessGroup field comprises bits corresponding to the set of HARQ processes configured for the UE 202. Each bit has either value 0 (indicating that the corresponding HARQ process is not included in the HPG) or value 1 (indicating that the corresponding HARQ process is included in the HPG).

Further, in FIG. 3b, the plurality of HPGs and the HARQ processes associated therewith are indicated using a respectively plurality of PriorityList fields. This type of signaling is applicable when the plurality of HPGs are formed based on the priority class of the associated HARQ processes, as explained above in FIG. 2c. In some embodiments, the field PriorityList identifies an HPG with a select priority index and the one or more HARQ process that are associated with the priority index. However, other configurations for the HPG configuration signal 206 are also contemplated to be within the scope of this disclosure. Upon receiving the HPG configuration signal 206 from the BS 204, the UE 202 is configured to receive and process the HPG configuration signal 206. In some embodiments, the UE 202 is configured to determine the information of the plurality HARQ process groups (HPGs) configured for the UE 202, based on processing the HPG configuration signal 206.

Referring back to FIG. 2a, in some embodiments, the BS 204 is further configured to provide a downlink control information (DCI) 208 to the UE 202. In some embodiments, the DCI 208 is configured to trigger a HARQ-ACK feedback signal 210 from the UE 202. In some embodiments, the HARQ-ACK feedback signal 210 is configured to include HARQ-ACK information associated with one or more HARQ processes configured for the UE 202. In some embodiments, the DCI 208 comprises information of physical uplink control channel (PUCCH)/physical uplink shared channel (PUSCH) resources to be utilized by the UE 102 for the transmission of the HARQ-ACK feedback signal 210. In some embodiments, the HARQ-ACK feedback signal 210 comprises a Type-3 HARQ-ACK feedback or a Type-3 HARQ-ACK codebook. In such embodiments, the DCI 208 comprises a one-shot HARQ-ACK frequent field, a value associated therewith providing an indication to the UE 102 to trigger a Type-3 HARQ-ACK feedback. Alternately, in other embodiments, the HARQ-ACK feedback signal 210 may comprise other types of HARQ-ACK signals, for example, Type-1 HARQ-ACK feedback signal or a Type-1 HARQ-ACK codebook. In some embodiments, the Type-1 HARQ-ACK feedback signal is configured by radio resource control (RRC) signaling. In some embodiments, the DCI 208 is configured to trigger the HARQ-ACK feedback signal 210 from the UE 202, in response to a physical downlink shared channel (PDSCH) scheduled by the DCI 208. Alternately, in other embodiments, for example, in the case of Type-3 HARQ-ACK feedback, the DCI 208 may trigger the HARQ-ACK feedback signal 210, without scheduling the PDSCH to the UE 202. In some embodiments, the DCI 208 further comprises information that identifies one or more HPGs of the plurality of HPGs configured for the UE 202 (by the HPG configuration signal 206), the HARQ-ACK feedback information of which are to be included in the HARQ-ACK feedback signal 210 that is triggered by the DCI 208.

Once the BS 202 provides/sends the DCI 208 to the UE 202, the UE 202 is configured to receive and process the DCI 208. Upon processing the DCI 208, the UE 202 is configured to identify the one or more HPGs identified in the DCI 208. Further, the UE 202 is configured to generate the HARQ-ACK feedback signal 210 comprising the HARQ-ACK feedback information of HARQ processes associated with the one or more HPGs (indicated by the DCI 208). In such embodiments, the HARQ-ACK feedback signal 210 would not include HARQ-ACK feedback information of HARQ processes associated with other HPGs within the plurality of HPGs that are different from the one or more HPGs indicated in the DCI 208. Subsequently, the UE 202 is configured to provide/send the HARQ-ACK feedback signal 210 to the BS 204.

The DCI 208 may be configured to indicate to the UE 202, the information that identifies one or more HPGs of the plurality of HPGs configured for the UE 202, differently in different embodiments. In a first embodiment, an HPG request field comprising an HPG request field value that identifies the one or more HPGs is included as part of the DCI 208. In some embodiments, the HPG request field value is mapped to one or more HPGs and serving cell(s), in accordance with a predefined mapping as illustrated in Table 2 below. Specifically, Table 2 indicates a predefined mapping between the HPG request field value and a pair of servings cells, HPG(s).

TABLE 2

Predefined mapping between the HPG request field value and HPG(s).

| Value of the HPG Request Field | Description |
|---|---|
| 00 | A 1st set {serving cells(s), HPG(s)} configured by higher layers |
| 01 | A 2nd set {serving cells(s), HPG(s)} configured by higher layers |

TABLE 2-continued

Predefined mapping between the HPG request
field value and HPG(s).

| Value of the HPG Request Field | Description |
|---|---|
| 10 | A 3rd set {serving cells(s), HPG(s)} configured by higher layers |
| 11 | A 4th set {serving cells(s), HPG(s)} configured by higher layers |

Table 2 above indicates a 2-bit value for the HPG Request Field. However, in other embodiments, the value of the HPG request field may have more or less than 2 bits depending on the number of HPGs configured. Further, the HPGs associated with each set may be different in different embodiments. In such embodiments, the UE 202 is configured to determine the one or more HPGs, based on processing the DCI 208, in accordance with the predefined mapping between the HPG request field value and the one or more HPGs, as given in Table 2 above. For example, if the HPG request filed value indicated in the DCI 208 is 01, the UE 202 is configured to provide HARQ-ACK information associated with the $2^{nd}$ set of HPGs from Table 2, as part of the HARQ-ACK feedback signal 210.

In a second embodiment, the DCI 208 comprises cyclic redundancy check (CRC) bits that are scrambled by a predefined HPG sequence, say [w0, w1 . . . w15]. In some embodiments, the predefined HPG sequence identifies the one or more HPGs, the HARQ-ACK feedback information of which are to be included in the HARQ-ACK feedback signal 210. In some embodiments, the predefined HPG sequence identifies the one or more HPGs, based on a predefined mapping between the predefined HPG sequence and the one or more HPGs of the plurality of HPGs. Table 3 illustrates an example mapping between the predefined HPG sequence and the one or more HPGs.

TABLE 3

Predefined mapping between the predefined
HPG sequence and HPG sequence value

| HPG sequence value | [w0, w1, w2, w3 . . . w15] |
|---|---|
| 00 | [0, 0, 0, 0 . . . , 0] |
| 01 | [0, 1 ,0, 1 . . . , 0] |
| 10 | [1, 0, 1, 0 . . . , 1] |
| 11 | [1, 1, 1, 1 . . . , 1] |

Specifically, Table 3 provides a mapping between the predefined sequence and a corresponding HPG sequence value. In some embodiments, the HPG sequence value is mapped to one or more HPGs, based on the predefined mapping in Table 4 below.

TABLE 4

Predefined mapping between the predefined
HPG sequence and HPG(s).

| HPG Sequence Value | Description |
|---|---|
| 00 | A 1st set {serving cells(s), HPG(s)} configured by higher layers |
| 01 | A 2nd set {serving cells(s), HPG(s)} configured by higher layers |

TABLE 4-continued

Predefined mapping between the predefined
HPG sequence and HPG(s).

| HPG Sequence Value | Description |
|---|---|
| 10 | A 3rd set {serving cells(s), HPG(s)} configured by higher layers |
| 11 | A 4th set {serving cells(s), HPG(s)} configured by higher layers |

In such embodiments, the UE 202 is configured to descramble the CRC bits to determine the predefined HPG sequence and determine the one or more HPGs, based on the predefined HPG sequence, in accordance with the predefined mapping between the predefined HPG sequence and the one or more HPGs. For example, if the predefined sequence is determined to be [0, 1, 0, 1 . . . , 0], the UE 202 identifies the corresponding HPG sequence value as "01" from the Table 3 above and determine the one or more HPGs associated with the HPG sequence value "01" from Table 4 above. However, in other embodiments, Table 3 may comprise a direct mapping between the predefined HPG sequence and the one or more HPGs.

In a third embodiment, when the grouping is based on priority class index, the DCI 208 further includes a priority indicator field that comprises information on a select priority class index (e.g., priority class index 0 in FIG. 2c) associated with an HPG configured for the UE 202. In such embodiments, the UE 202 is configured to determine the one or more HARQ processes (e.g., HPI 0/1/8/9 in FIG. 2c) associated with the HPG identified by the select priority class index, based on processing the DCI 208. Further, the UE 202 is configured to generate the HARQ-ACK feedback signal 210 comprising HARQ feedback information of the one or more HARQ processes associated with the select priority class index.

Figures 4A, 4B:
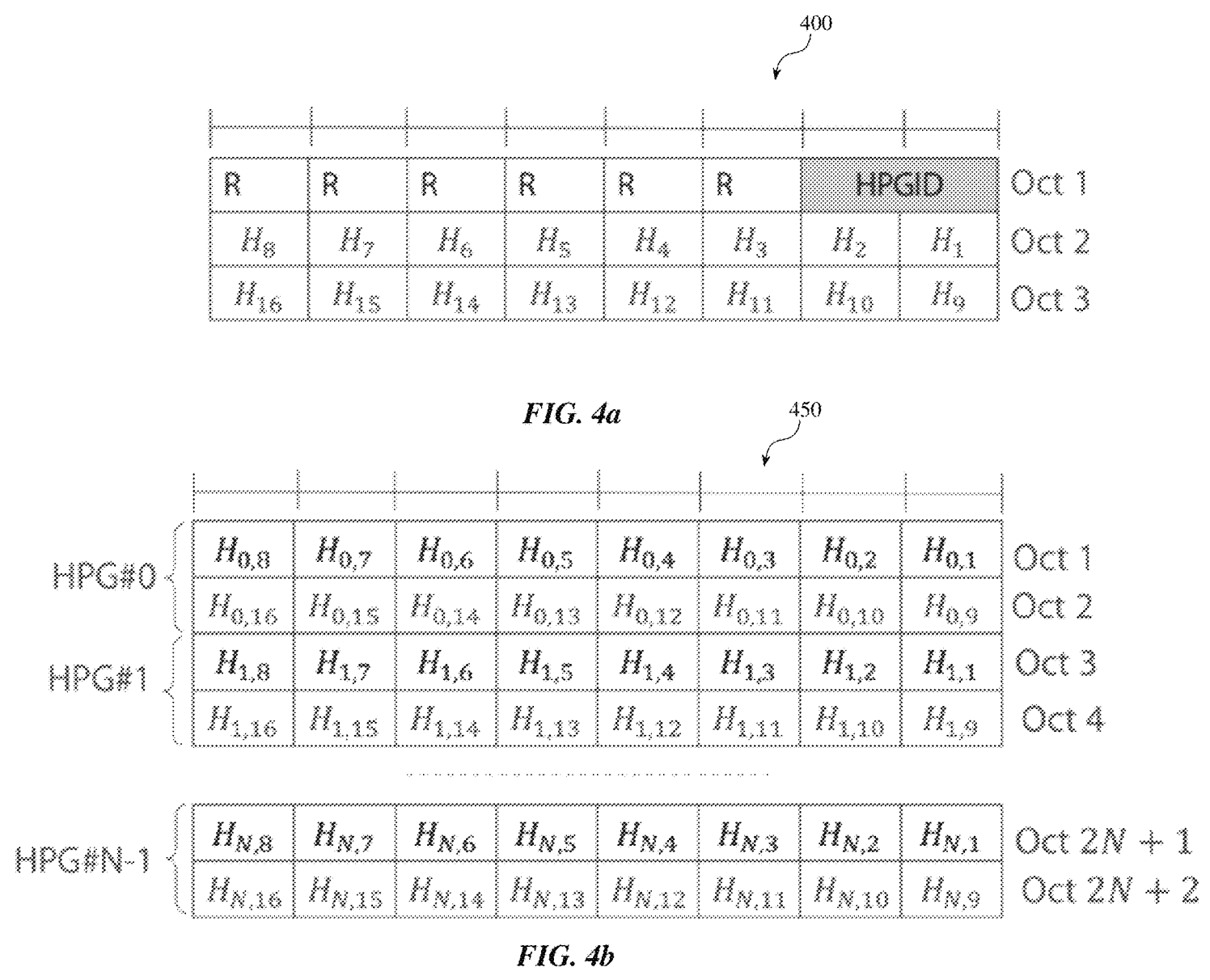

Referring back to FIG. 2a, in some embodiments, the BS 204 is further configured to generate and provide a HARQ process regrouping signal 212 to the UE 202. In some embodiments, the HARQ process regrouping signal 212 comprises information to regroup the HARQ processes associated with one or more HPGs of the plurality of HPGs configured for the UE 202 (e.g., by the HPG configuration signal 206). In some embodiments, the regrouping information is included in a HARQ regroup media access control (MAC) control element (CE) within the HARQ process regrouping signal 208. In some embodiments, the HARQ regroup MAC CE is identified using a dedicated logical channel ID (LCID) in MAC header or sub-header. In a first embodiment, the HARQ process regrouping signal 212 comprises one or more HARQ regroup MAC CEs, each HARQ regroup MAC CE being associated with a respective HPG identifier (ID) that identifies an HPG of the plurality of HPGs configured for the UE 202. Each HARQ regroup MAC CE (as illustrated in FIG. 4a) has a fixed size and comprises a plurality of octets containing a respective HPGID and a set of H-fields that corresponds to the set of HARQ processes configured for the UE. In some embodiments, each H-field of the set of H-fields identifies a HARQ process of the set of HARQ processes configured for the UE 202. In some embodiments, a value associated with each H-field of the set of H-fields identifies one or more HARQ processes that are included within an HPG identified by the respective HPGID.

FIG. 4a illustrates an example HARQ regroup MAC CE 400 associated with the first embodiment. The HARQ regroup MAC CE 400 is associated with a select HPG identified by an HPGID. The HARQ regroup MAC CE 400 has 3 octets, Octet #1, Octet #2 and Octet #3. The HARQ regroup MAC CE 400 further includes 16 H-fields (can be different in other embodiments) that correspond to a set of 16 HARQ processes configured for the UE 202. Each of the H-fields is identified as Hi, where i identifies the corresponding HARQ process. If the Hi field is set as "1", it can be identified that the corresponding HARQ process is included in the HPG identified by the HPGID. Alternately, if the Hi field is set as "0", it can be identified that the corresponding HARQ process is excluded from the HPG identified by the HPGID. In some embodiments, the excluded HARQ processes are to be added to a default HPG. In some embodiments, the default HPG is configured by higher layers.

In a second embodiment, the HARQ process regrouping signal 212 comprises a HARQ regroup MAC CE that comprises one or more set of H-fields respectively associated with one or more HPGs of plurality of HPGs configured for the UE 202. The HARQ regroup MAC CE has a fixed size and comprises a plurality of octets comprising the one or more sets of H-fields. Each set of H-fields of the one or more sets of H-fields corresponds to the set of HARQ processes configured for the UE. Specifically, each H-field within a set of H-fields of the one or more sets of H-fields identifies a HARQ process of the set of HARQ processes configured for the UE 202. In some embodiments, a value associated with each H-field of the set of H-fields associated with an HPG identifies one or more HARQ processes that are included within the HPG.

FIG. 4b illustrates an example HARQ regroup MAC CE 450 associated with the second embodiment. The HARQ regroup MAC CE 450 is associated with N HPGs identified by the HPG IDs HPG #0 . . . HPG #N−1. The HARQ regroup MAC CE 400 further includes 16 H-fields (can be different in other embodiments) per HPGID, wherein the 16 H-fields (can be different in other embodiments) correspond to a set of 16 HARQ processes configured for the UE 202. Each of the H-fields is identified as $H_{g,i}$, where g identifies the HPGID and i identifies the corresponding HARQ process. If the $H_{g,i}$ field is set as "1", it can be identified that the HARQ process i is included in the HPG g. Alternately, if the $H_{g,i}$ field is set as "0", it can be identified that the HARQ process i is excluded from the HPG g. Referring back to FIG. 2a, the UE 202 is further configured to receive and process the HARQ process regrouping signal 208. Upon processing the HARQ process regrouping signal 208, the UE 202 is configured to determine a plurality of updated HPGs configured for the UE 202.

Figure 5:
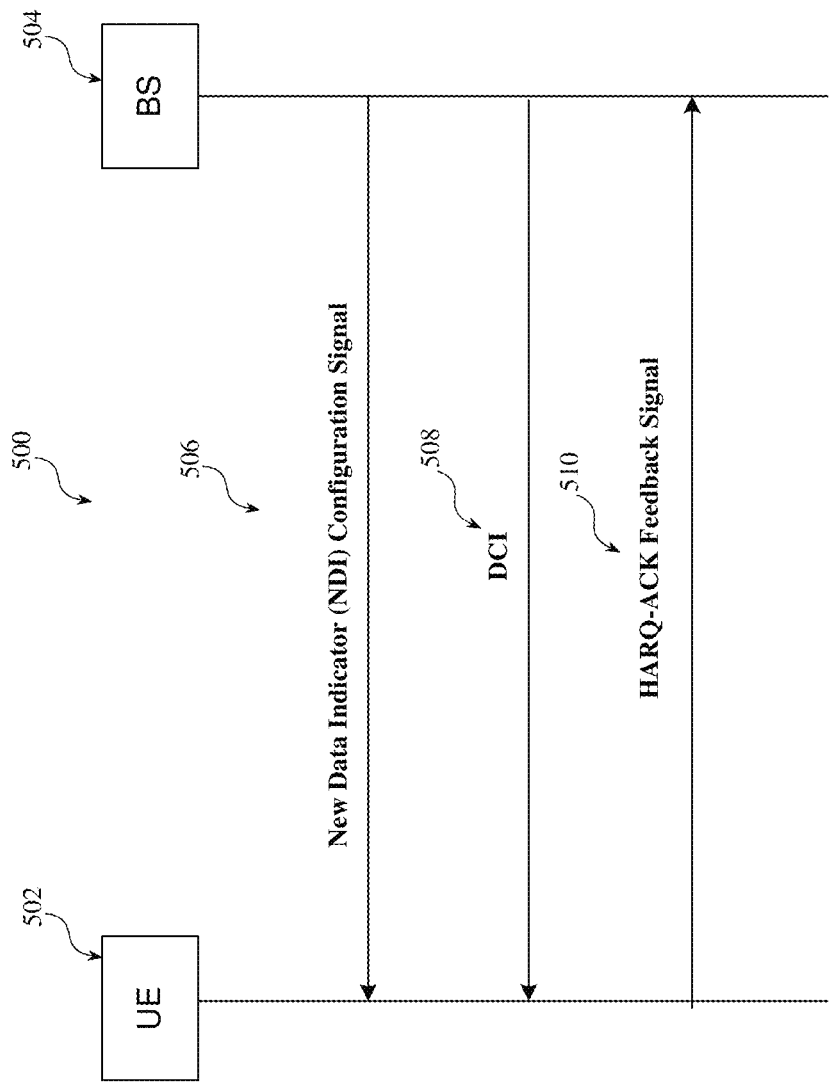
FIG. 5 illustrates a simplified block diagram of a wireless communication system that facilitates to provide new data indicator (NDI) as part of HARQ-ACK feedback, according to one embodiment of the disclosure.

FIG. 5 illustrates a simplified block diagram of a wireless communication system 500, according to one embodiment of the disclosure. In some embodiments, the wireless communication system 500 facilitates to provide new data indicator (NDI) as part of HARQ-ACK feedback. The wireless communication system 500 comprises a user equipment (UE) 502 and a base station (BS) 504. In other embodiments, however, the wireless communication system 500 can comprise a plurality of UEs and is not shown here for clarity purposes. In some embodiments, base station 504 is equivalent to an eNodeB in LTE systems, gNodeB in 5G new radio (NR) systems etc. In some embodiments, the UE 502 may comprise a mobile phone, tablet computer, an internet of things (IoT) device, a vehicle-to-everything (V2X) UE, etc. The UE 502 and the base station 504 are configured to communicate with one another over a communication medium (e.g., air).

In some embodiments, the UE 502 is configured with a set of HARQ processes. In some embodiments, the set of HARQ processes are configured by radio resource control (RRC) signaling. In some embodiments, the BS 504 is configured to send/provide a new data indicator (NDI) configuration signal 506 to the UE 502. In some embodiments, the NDI configuration signal 506 is configured to configure the UE 502 to include a latest NDI value detected by the UE 502 for one or more HARQ processes along with the HARQ-ACK information for the corresponding HARQ processes, as part of a HARQ-ACK feedback signal (e.g., the HARQ-ACK feedback signal 510). In some embodiments, the NDI configuration signal 506 comprises a radio resource configuration (RRC) signal. The UE 502 is configured to receive and process the NDI configuration signal 506.

In some embodiments, the BS 504 is further configured to provide a downlink control information (DCI) 508 to the UE 502. The DCI 508 is configured to trigger a HARQ-ACK feedback signal 510 from the UE 502. In some embodiments, the DCI 508 comprises information of physical uplink control channel (PUCCH)/physical uplink shared channel (PUSCH) resources to be utilized by the UE 502 for the transmission of the HARQ-ACK feedback signal 510. In some embodiments, the HARQ-ACK feedback signal 510 comprises a Type-3 HARQ-ACK feedback/codebook. In such embodiments, the DCI 508 comprises a one-shot HARQ-ACK frequent field, a value associated therewith providing an indication to the UE 502 to trigger a Type-3 HARQ-ACK feedback. Alternately, in other embodiments, the HARQ-ACK feedback signal 510 may comprise other types of HARQ-ACK signals, for example, Type-1 HARQ-ACK feedback signal/Type-1 HARQ-ACK codebook. In some embodiments, the DCI 508 is configured to trigger the HARQ-ACK feedback signal 510 from the UE 502, in response to a physical downlink shared channel (PDSCH) scheduled by the DCI 508. Alternately, in other embodiments, for example, in the case of Type-3 HARQ-ACK feedback, the DCI 508 may trigger the HARQ-ACK feedback signal 510, without scheduling the PDSCH to the UE 502. The UE 502 is configured to receive and process the DCI 508. In some embodiments, the UE 502 is further configured to generate the HARQ-ACK feedback signal 510, in response to processing the DCI 508. In some embodiments, the HARQ-ACK feedback signal 510 comprises a HARQ-ACK feedback information for one or more HARQ processes associated with the UE 502, and an NDI value (i.e., a latest NDI value) detected by the UE 502 for the corresponding one or more HARQ processes. Subsequently, the UE 502 is configured to provide/send the HARQ-ACK feedback signal 510 to the BS 504. The BS 504 is further configured to receive and process the HARQ-ACK feedback signal 510.

In some embodiments, the NDI value for the corresponding HARQ processes are detected by the UE 502 from the Das that schedules the corresponding HARQ processes (or PDSCHs for the HARQ processes). In some embodiments, including NDI value as part of the HARQ-ACK feedback signal 510 facilitates the BS 504 to identify any mismatch between the data provided by the BS 504 and the respective HARQ-ACK information provided by the UE 502. In some embodiments, the UE 502 may be configured with a plurality of HARQ process groups (HPGs), as explained above with respect to FIG. 2a. In such embodiments, if the DCI 508 includes information that identifies one or more HPGs of the plurality of HPGs (similar to the DCI 208 in FIG. 2a), the HARQ-ACK feedback signal 510 is configured to include a latest new data indicator (NDI) value detected by the UE 502 for each of the HARQ processes associated with the one or more HPGs that are identified by the DCI 508.

Figure 6:
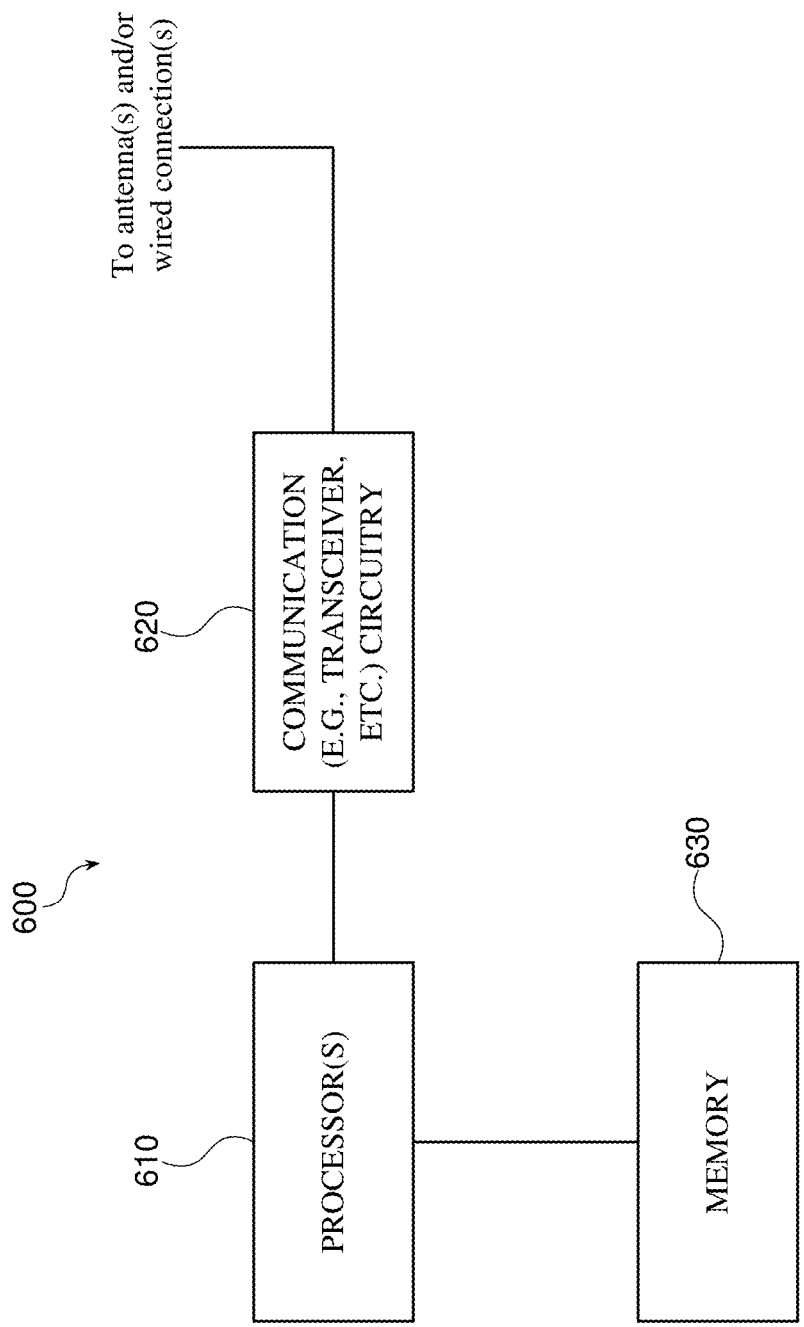
FIG. 6 illustrates a block diagram of an apparatus employable at a Base Station (BS), eNodeB, gNodeB or other network device, according to various aspects described herein.

Referring to FIG. 6, illustrated is a block diagram of an apparatus 600 employable at a Base Station (BS), eNodeB, gNodeB or other network device, according to various aspects described herein. In some embodiments, the apparatus 900 may be included within the BS 104, the BS 204 and the BS 504 in the above embodiments. However, in other embodiments, the apparatus 600 could be included within any gNodeB associated with a new radio (NR) system. The apparatus 600 can include one or more processors 610 (e.g., one or more baseband processors such as one or more of the baseband processors discussed in connection with FIG. 15 and/or FIG. 16) comprising processing circuitry and associated interface(s) (e.g., one or more interface (s) discussed in connection with FIG. 16), transceiver circuitry 620 (e.g., which can comprise circuitry for one or more wired connections and/or part or all of RF circuitry 1506, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 630 (which can comprise any of a variety of storage mediums and can store instructions and/or data associated with one or more of processor(s) 610 or transceiver circuitry 620).

In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 900 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 610, transceiver circuitry 620, and the memory 630 can be included in a single device, while in other aspects, they can be included in different devices, such as part of a distributed architecture.

Figure 7:
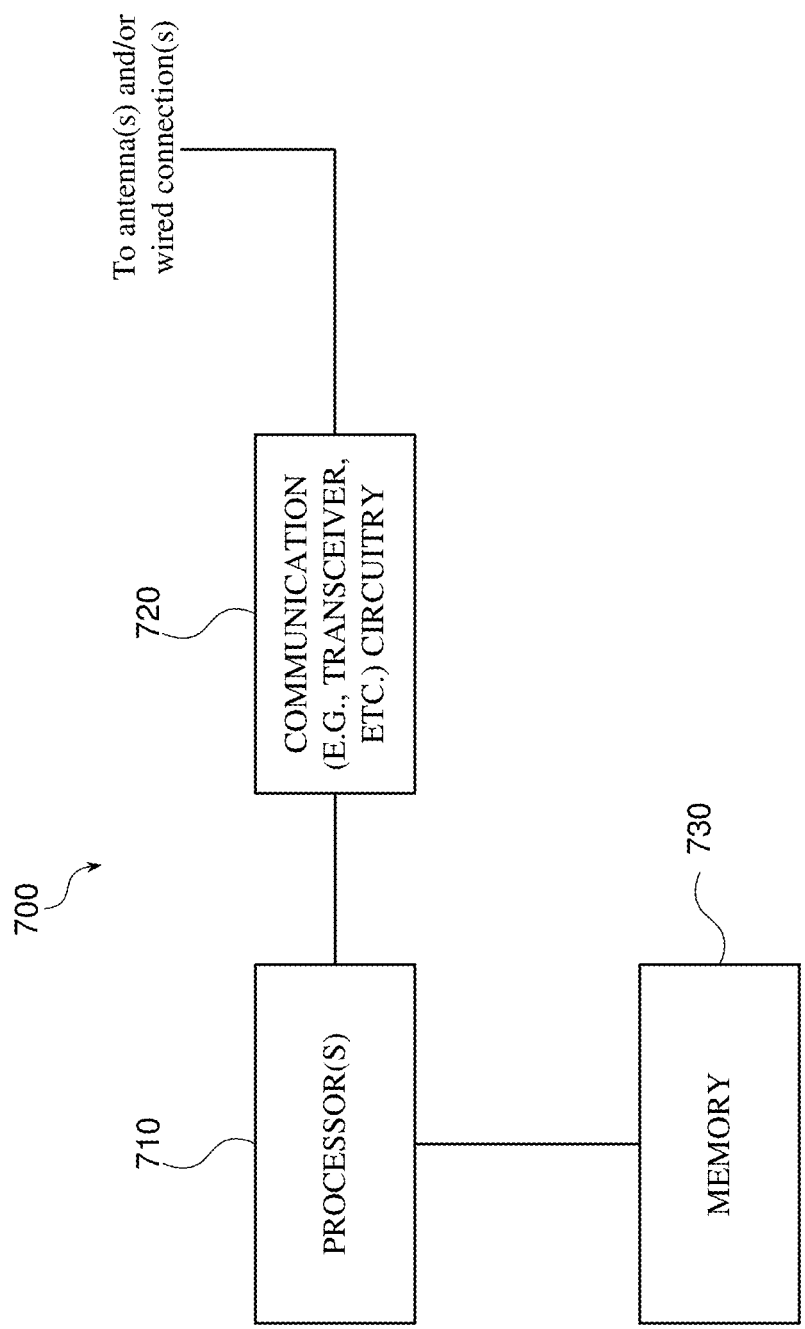
FIG. 7 illustrates a block diagram of an apparatus employable at a user equipment (UE) or other network device (e.g., IoT device), according to various aspects described herein.

Referring to FIG. 7, illustrated is a block diagram of an apparatus 700 employable at a user equipment (UE) or other network device (e.g., IoT device), according to various aspects described herein. In some embodiments, the apparatus 1000 may be included within the UE 102, the UE 202 and the UE 502 in the above embodiments. However, in other embodiments, the apparatus 700 could be included within any UE associated with a new radio (NR) system. Apparatus 700 can include one or more processors 710 (e.g., one or more baseband processors such as one or more of the baseband processors discussed in connection with FIG. 15 and/or FIG. 16) comprising processing circuitry and associated interface(s) (e.g., one or more interface(s) discussed in connection with FIG. 16), transceiver circuitry 720 (e.g., comprising part or all of RF circuitry 1506, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 730 (which can comprise any of a variety of storage mediums and can store instructions and/or data associated with one or more of processor(s) 710 or transceiver circuitry 720). In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 1000 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 710) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 710) can comprise one or more of: identifying physical resources associated with the signal/message, detecting the signal/message, resource element group deinterleaving, demodulation, descrambling, and/or decoding.

Figure 8:
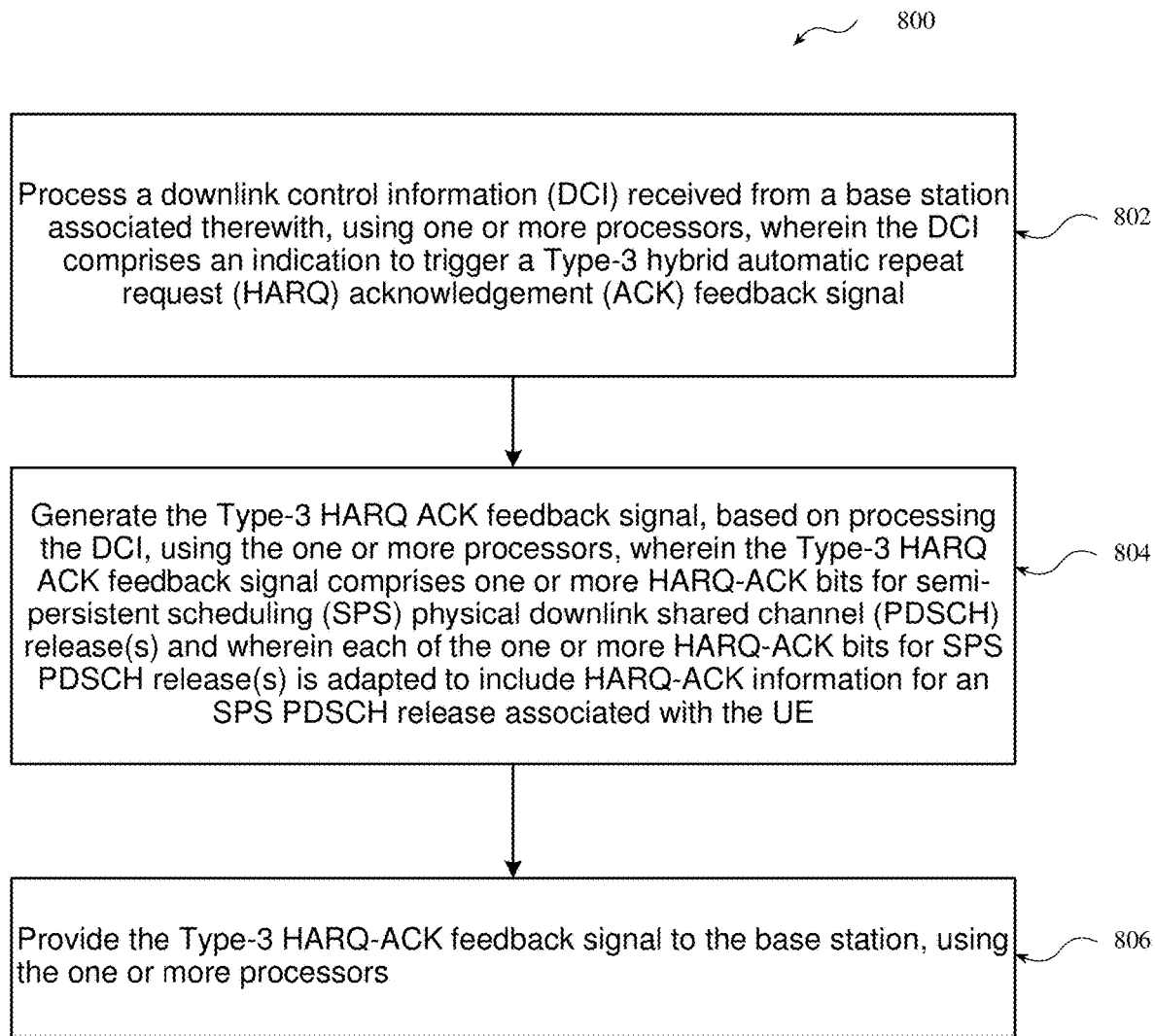
FIG. 8 illustrates a flowchart of a method for a UE associated with a wireless communication system that supports SPS release together with Type-3 HARQ-ACK codebook configuration, according to one embodiment of the disclosure.

FIG. 8 illustrates a flowchart of a method 800 for a UE associated with a wireless communication system that supports SPS release together with Type-3 HARQ-ACK codebook configuration, according to one embodiment of the disclosure. The method 800 is explained herein with reference to the apparatus 700 in FIG. 7. In some embodiments, the apparatus 700 could be included within the UE 102 in FIG. 1. Therefore, the method 800 is further explained with reference to the wireless communication system 100 in FIG. 1. At 802, a downlink control information (DCI) (e.g., the DCI 106 in FIG. 1) received from a base station (e.g., the BS 104 in FIG. 1) associated therewith, is processed using the one or more processors 710. In some embodiments, the DCI comprises an indication to trigger a Type-3 hybrid automatic repeat request (HARQ) acknowledgement (ACK) feedback signal (e.g., the Type-3 HARQ-ACK feedback signal 108 in FIG. 1).

At 804, the Type-3 HARQ ACK feedback signal is generated, based on processing the DCI, using the one or more processors 710. In some embodiments, the Type-3 HARQ ACK feedback signal comprises one or more HARQ-ACK bits for semi-persistent scheduling (SPS) physical downlink shared channel (PDSCH) release(s). In some embodiments, each of the one or more HARQ-ACK bits for SPS PDSCH release(s) is adapted to include HARQ-ACK information for an SPS PDSCH release associated with the UE. At 806, the Type-3 HARQ-ACK feedback signal is provided to the base station, using the one or more processors 710.

Figure 9:
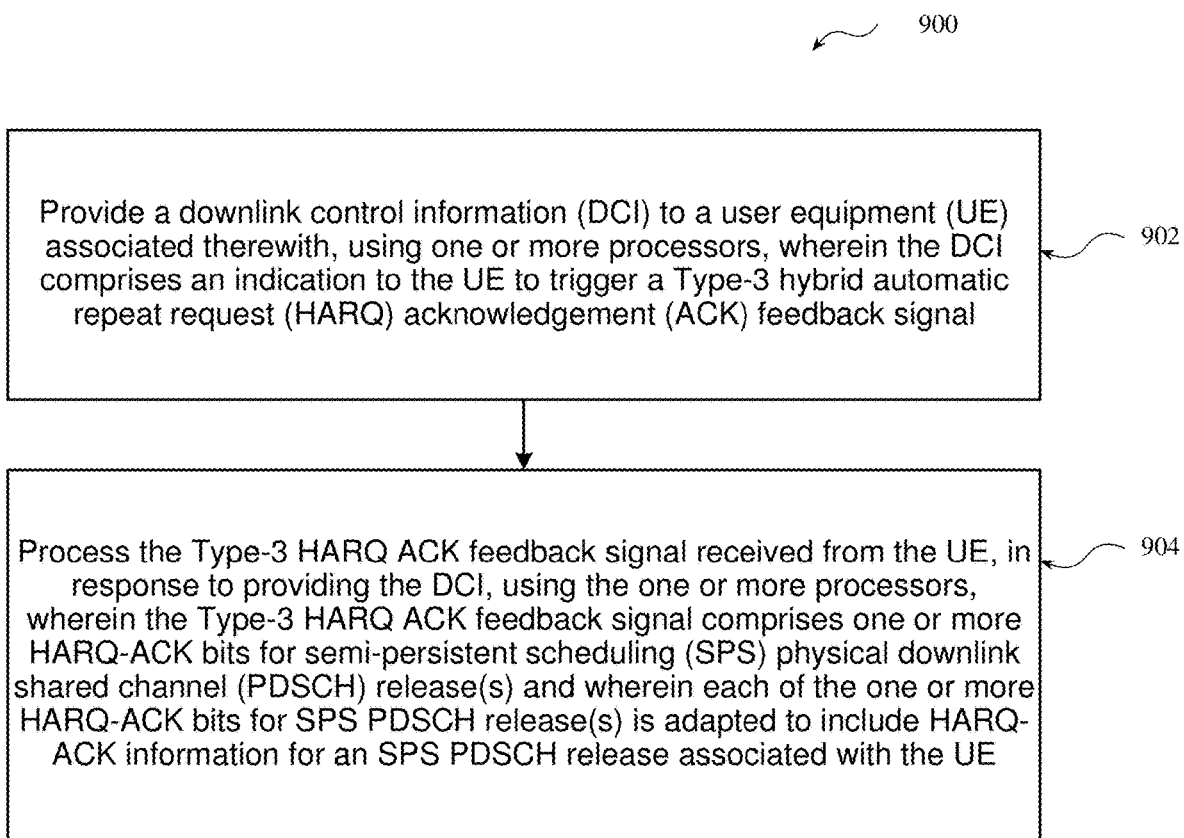
FIG. 9 illustrates a flowchart of a method for a base station (BS) associated with a wireless communication system that supports SPS release together with Type-3 HARQ-ACK codebook configuration, according to one embodiment of the disclosure.

FIG. 9 illustrates a flowchart of a method 900 for a base station (BS) associated with a wireless communication system that supports SPS release together with Type-3 HARQ-ACK codebook configuration, according to one embodiment of the disclosure. The method 900 is explained herein with reference to the apparatus 600 in FIG. 6. In some embodiments, the apparatus 600 could be included within the BS 104 in FIG. 1. Therefore, the method 900 is further explained with reference to the wireless communication system 100 in FIG. 1. At 902, a downlink control information (DCI) (e.g., the DCI 106 in FIG. 1) is provided to a user equipment (UE) (e.g., the UE 102 in FIG. 1) associated therewith, using the one or more processors 610. In some embodiments, the DCI comprises an indication to the UE to trigger a Type-3 hybrid automatic repeat request (HARQ) acknowledgement (ACK) feedback signal (e.g., the Type-3 HARQ-ACK feedback signal 108 in FIG. 1). At 904, the Type-3 HARQ ACK feedback signal received from the UE, in response to providing the DCI, is processed using the one or more processors 610. In some embodiments, the Type-3 HARQ ACK feedback signal comprises one or more HARQ-ACK bits for semi-persistent scheduling (SPS) physical downlink shared channel (PDSCH) release(s). In some embodiments, each of the one or more HARQ-ACK bits for SPS PDSCH release(s) is adapted to include HARQ-ACK information for an SPS PDSCH release associated with the UE.

Figure 10:
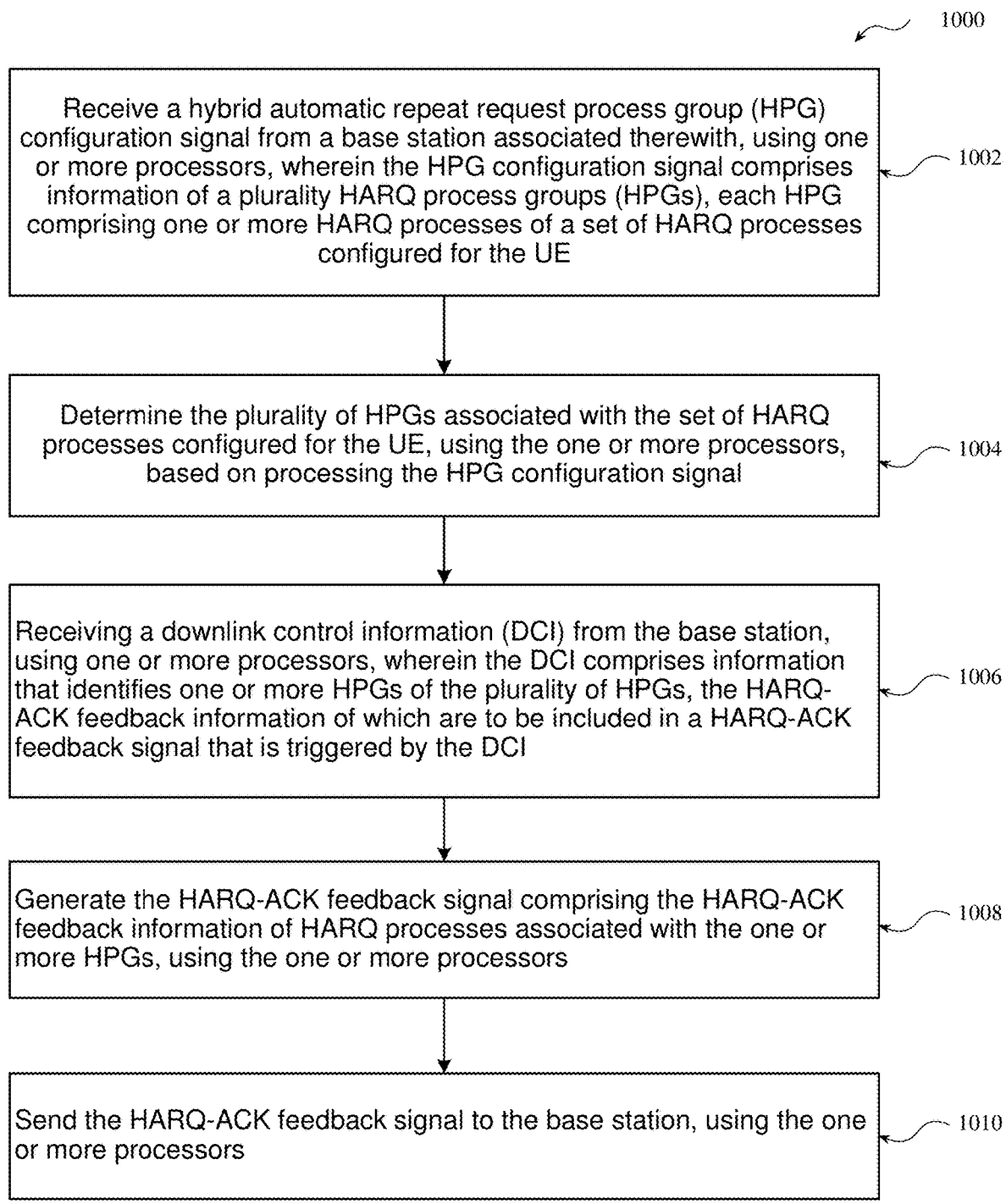
FIG. 10 illustrates a flowchart of a method for a UE associated with a wireless communication system that supports group-based HARQ-ACK feedback, according to one embodiment of the disclosure.

FIG. 10 illustrates a flowchart of a method 1000 for a UE associated with a wireless communication system that supports group-based HARQ-ACK feedback, according to one embodiment of the disclosure. The method 1000 is explained herein with reference to the apparatus 700 in FIG. 7. In some embodiments, the apparatus 700 could be included within the UE 202 in FIG. 2a. Therefore, the method 1000 is further explained with reference to the wireless communication system 200 in FIG. 2a. At 1002, a hybrid automatic repeat request process group (HPG) configuration signal (e.g., the HPG configuration signal 206 in FIG. 2a) is received from a base station (e.g., the BS 204) associated therewith, using the one or more processors 710. In some embodiments, the HPG configuration signal comprises information of a plurality HARQ process groups (HPGs), each HPG comprising one or more HARQ processes of a set of HARQ processes configured for the UE.

At 1004, the plurality of HPGs associated with the set of HARQ processes configured for the UE, is determined using the one or more processors 710, based on processing the HPG configuration signal. At 1006, a downlink control information (DCI) (e.g., the DCI 208 in FIG. 2a) is received from the base station, using the one or more processors 710. In some embodiments, the DCI comprises information that identifies one or more HPGs of the plurality of HPGs, the HARQ-ACK feedback information of which are to be included in a HARQ-ACK feedback signal (e.g., the HARQ-ACK feedback signal 210 in FIG. 2a) that is triggered by the DCI. At 1008, the HARQ-ACK feedback signal comprising the HARQ-ACK feedback information of HARQ processes associated with the one or more HPGs, is generated using the one or more processors 710. At 1010, the HARQ-ACK feedback signal is send to the base station, using the one or more processors 710.

Figure 11:
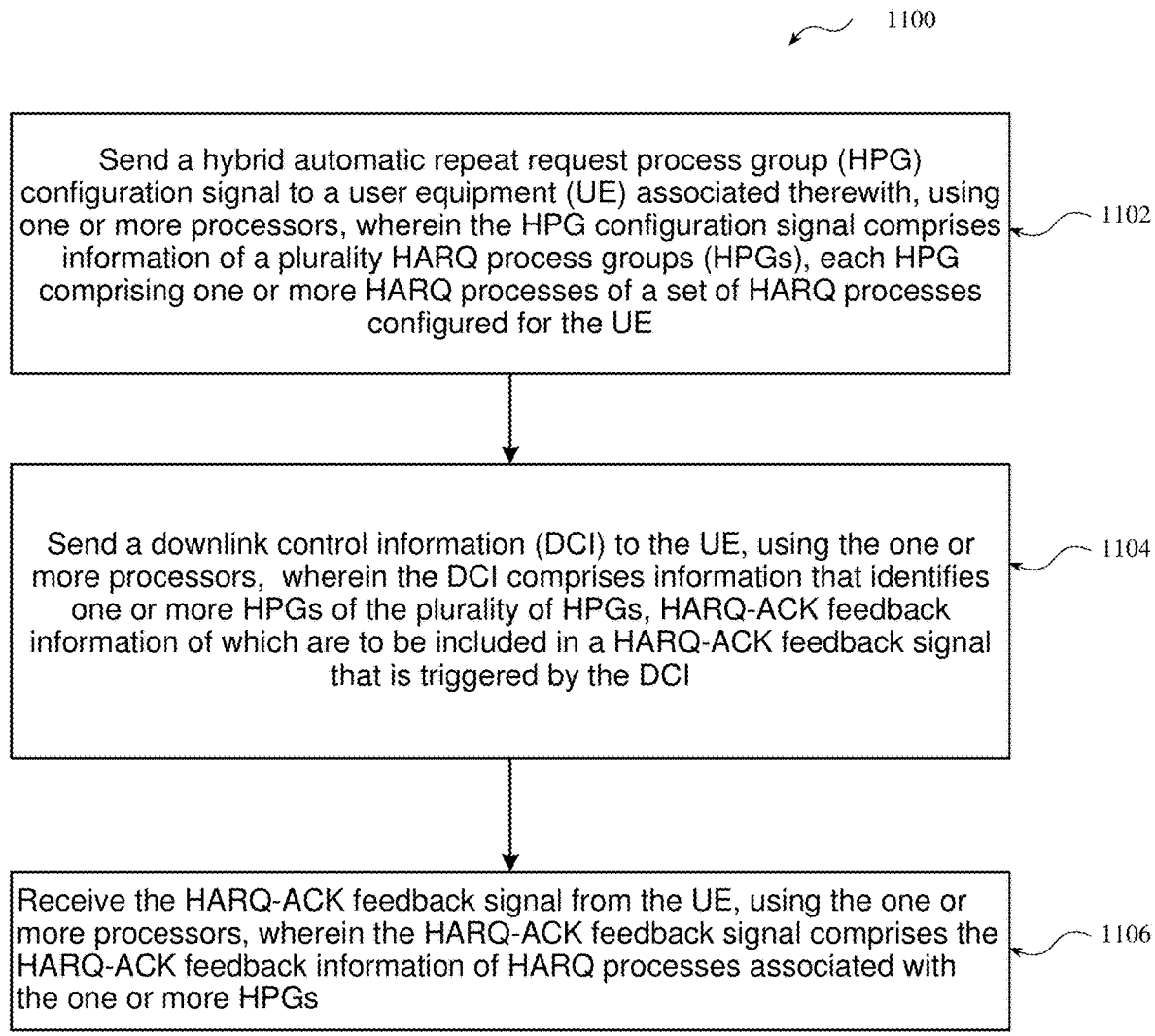
FIG. 11 illustrates a flowchart of a method for a base station associated with a wireless communication system that supports group-based HARQ-ACK feedback, according to one embodiment of the disclosure.

FIG. 11 illustrates a flowchart of a method 1100 for a base station (BS) associated with a wireless communication system that supports group based HARQ-ACK feedback, according to one embodiment of the disclosure. The method 1100 is explained herein with reference to the apparatus 600 in FIG. 6. In some embodiments, the apparatus 600 could be included within the BS 204 in FIG. 2a. Therefore, the method 1100 is further explained with reference to the wireless communication system 200 in FIG. 2a. At 1102, a hybrid automatic repeat request process group (HPG) configuration signal (e.g., the HPG configuration signal 206 in FIG. 2a) is send to a user equipment (UE) (e.g., the UE 202 in FIG. 2a) associated therewith, using the one or more processors 610. In some embodiments, the HPG configuration signal comprises information of a plurality HARQ process groups (HPGs), each HPG comprising one or more HARQ processes of a set of HARQ processes configured for the UE.

At 1104, a downlink control information (DCI) (e.g., the DCI 208 in FIG. 2a) is send to the UE, using the one or more processors 610. In some embodiments, the DCI comprises information that identifies one or more HPGs of the plurality of HPGs, HARQ-ACK feedback information of which are to be included in a HARQ-ACK feedback signal (e.g., the HARQ-ACK feedback signal 210 in FIG. 2a) that is triggered by the DCI. At 1106, the HARQ-ACK feedback signal is received from the UE, using the one or more processors 610. In some embodiments, the HARQ-ACK feedback signal comprises the HARQ-ACK feedback information of HARQ processes associated with the one or more HPGs.

Figure 12:
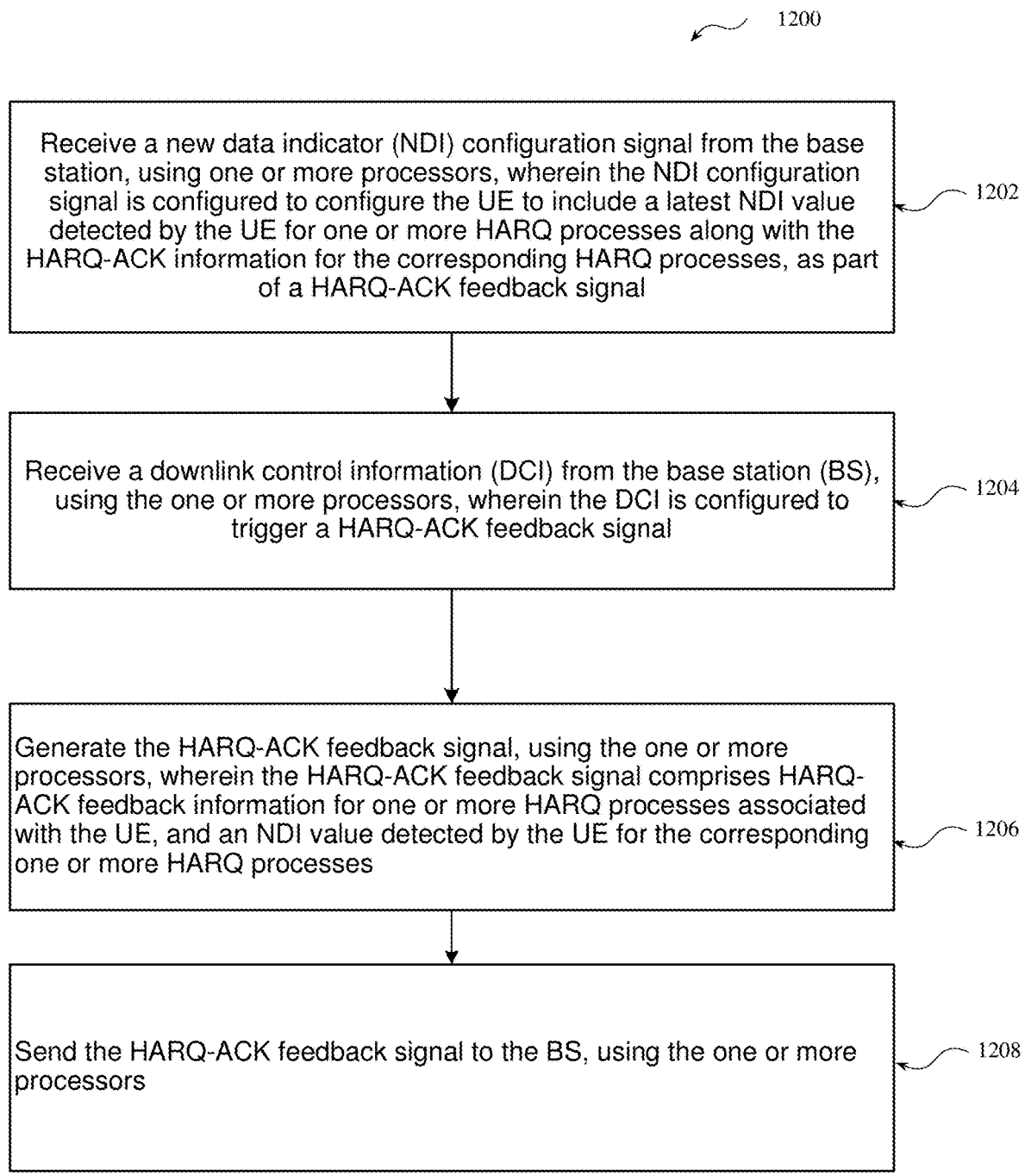
FIG. 12 illustrates a flowchart of a method for a UE associated with a wireless communication system that supports new data indicator (NDI) as part of HARQ-ACK feedback, according to one embodiment of the disclosure.

FIG. 12 illustrates a flowchart of a method 1200 for a UE associated with a wireless communication system that supports new data indicator (NDI) as part of HARQ-ACK feedback, according to one embodiment of the disclosure. The method 1200 is explained herein with reference to the apparatus 700 in FIG. 7. In some embodiments, the apparatus 700 could be included within the UE 502 in FIG. 5. Therefore, the method 1200 is further explained with reference to the wireless communication system 500 in FIG. 5. At 1202, a new data indicator (NDI) configuration signal (e.g., the NDI configuration signal 506 in FIG. 5) is received from a base station (e.g., the BS 504 in FIG. 5), using the one or more processors 710. In some embodiments, the NDI configuration signal is configured to configure the UE to include a latest NDI value detected by the UE for one or more HARQ processes along with the HARQ-ACK information for the corresponding HARQ processes, as part of a HARQ-ACK feedback signal. At 1204, a downlink control information (DCI) (e.g., the DCI 508 in FIG. 5) is received from the base station (BS), using the one or more processors 710. In some embodiments, the DCI is configured to trigger a HARQ-ACK feedback signal (e.g., the HARQ-ACK feedback signal 510 in FIG. 5). At 1206, the HARQ-ACK feedback signal is generated using the one or more processors 710. In some embodiments, the HARQ-ACK feedback signal comprises HARQ-ACK feedback information for one or more HARQ processes associated with the UE, and an NDI value detected by the UE for the corresponding one or more HARQ processes. At 1208, the HARQ-ACK feedback signal is send to the BS, using the one or more processors 710.

Figure 13:
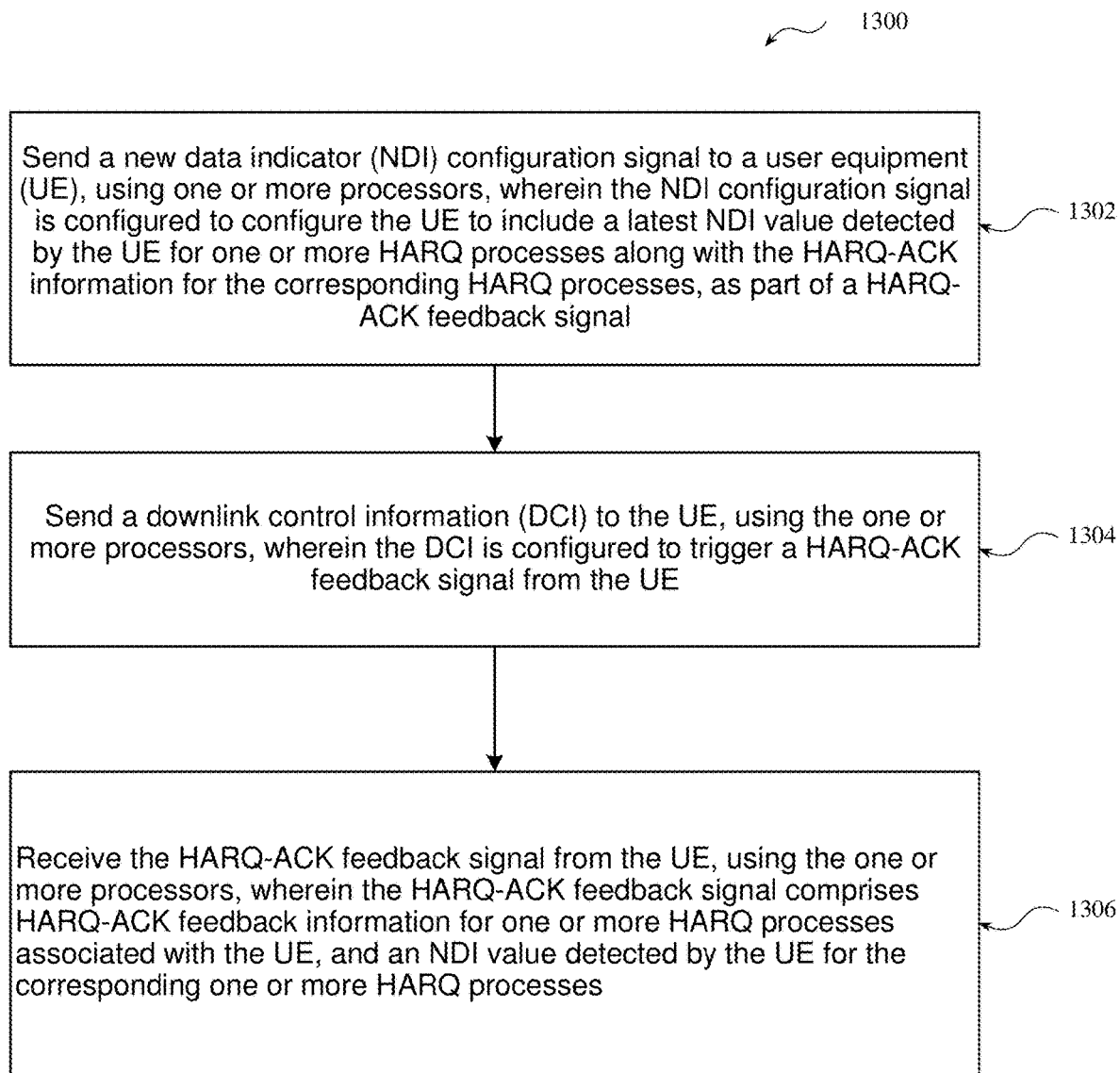
FIG. 13 illustrates a flowchart of a method for a base station associated with a wireless communication system that supports new data indicator (NDI) as part of HARQ-ACK feedback, according to one embodiment of the disclosure.

FIG. 13 illustrates a flowchart of a method 1300 for a base station (BS) associated with a wireless communication system that supports new data indicator (NDI) as part of HARQ-ACK feedback, according to one embodiment of the disclosure. The method 1300 is explained herein with reference to the apparatus 600 in FIG. 6. In some embodiments, the apparatus 1300 could be included within the BS 504 in FIG. 5. Therefore, the method 1300 is further explained with reference to the wireless communication system 500 in FIG. 5. At 1302, a new data indicator (NDI) configuration signal (e.g., the NDI configuration signal 506 in FIG. 5) is send to a user equipment (UE) (e.g., the UE 502 in FIG. 5), using the one or more processors 610. In some embodiments, the NDI configuration signal is configured to configure the UE to include a latest NDI value detected by the UE for one or more HARQ processes along with the HARQ-ACK information for the corresponding HARQ processes, as part of a HARQ-ACK feedback signal. At 1304, a downlink control information (DCI) (e.g., the DCI 508 in FIG. 5) is send to the UE, using the one or more processors 610. In some embodiments, the DCI is configured to trigger a HARQ-ACK feedback signal (e.g., the HARQ-ACK feedback signal 510 in FIG. 5) from the UE. At 1306, the HARQ-ACK feedback signal is received from the UE using the one or more processors 610. In some embodiments, the HARQ-ACK feedback signal comprises HARQ-ACK feedback information for one or more HARQ processes associated with the UE, and an NDI value detected by the UE for the corresponding one or more HARQ processes.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 14:
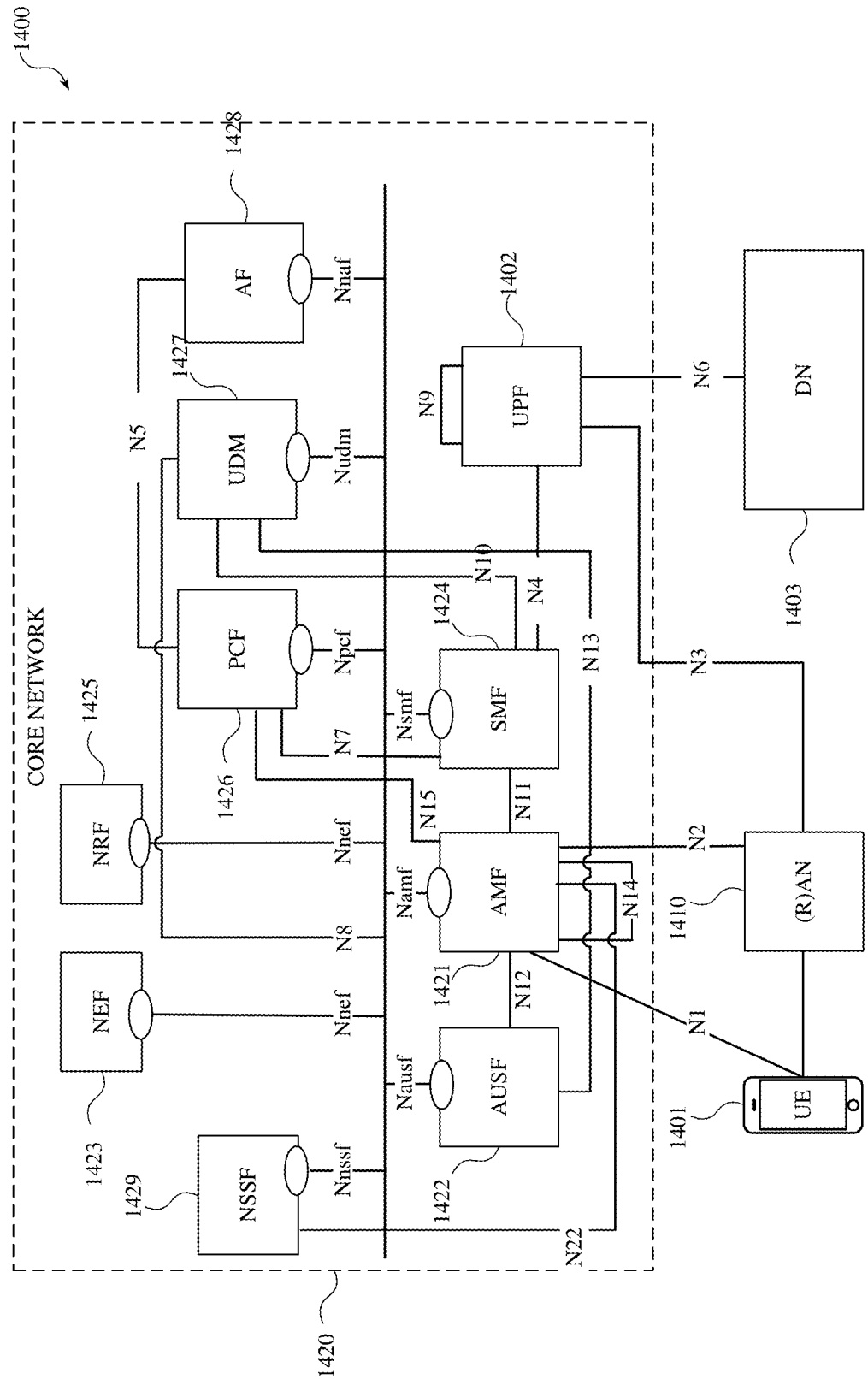
FIG. 14 illustrates an architecture of a system including a Core Network (CN), for example a Fifth Generation (5G) CN (5GC), in accordance with various embodiments.

Embodiments described herein can be implemented into a system using any suitably configured hardware and/or software. FIG. 14 illustrates an architecture of a system 1400 including a Core Network (CN) 1420, for example a Fifth Generation (5G) CN (5GC), in accordance with various embodiments. The system 1400 is shown to include a UE 1401, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s)), and/or other nodes) or other nodes or access points; and a Data Network (DN) 203, which can be, for example, operator services, Internet access or third party services; and a Fifth Generation Core Network (5GC) 1420. The 5GC 1420 can comprise one or more of the following functions and network components: an Authentication Server Function (AUSF) 1422; an Access and Mobility Management Function (AMF) 1421; a Session Management Function (SMF) 1424; a Network Exposure Function (NEF) 1423; a Policy Control Function (PCF) 1426; a Network Repository Function (NRF) 1425; a Unified Data Management (UDM) 1427; an Application Function (AF) 1428; a User Plane (UP) Function (UPF) 1402; and a Network Slice Selection Function (NSSF) 1429.

The UPF 1402 can act as an anchor point for intra-RAT and inter-RAT mobility, an external Protocol Data Unit (PDU) session point of interconnect to DN 1403, and a branching point to support multi-homed PDU session. The UPF 1402 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 1402 can include an uplink classifier to support routing traffic flows to a data network. The DN 1403 can represent various network operator services, Internet access, or third-party services. DN 1403 can include, or be similar to, an application server. The UPF 1402 can interact with the SMF 1424 via an N4 reference point between the SMF 1424 and the UPF 1402.

The AUSF 1422 can store data for authentication of UE 1401 and handle authentication-related functionality. The AUSF 1422 can facilitate a common authentication framework for various access types. The AUSF 1422 can communicate with the AMF 1421 via an N12 reference point between the AMF 1421 and the AUSF 1422; and can communicate with the UDM 1427 via an N13 reference point between the UDM 1427 and the AUSF 1422. Additionally, the AUSF 1422 can exhibit an Nausf service-based interface.

The AMF 1421 can be responsible for registration management (e.g., for registering UE 1401, etc.), connection management, reachability management, mobility management, and lawful interception of AMF-related events, and access authentication and authorization. The AMF 1421 can be a termination point for the an N11 reference point between the AMF 1421 and the SMF 1424. The AMF 1421 can provide transport for SM messages between the UE 1401 and the SMF 1424, and act as a transparent proxy for routing SM messages. AMF 1421 can also provide transport for SMS messages between UE 1401 and a Short Message Service (SMS) Function (SMSF) (not shown in FIG. 14). AMF 1421 can act as SEcurity Anchor Function (SEAF), which can include interaction with the AUSF 1422 and the UE 1401 and/or receipt of an intermediate key that was established as a result of the UE 1401 authentication process. Where Universal Subscriber Identity Module (USIM) based authentication is used, the AMF 1421 can retrieve the security material from the AUSF 1422. AMF 1421 can also include a Single-Connection Mode (SCM) function, which receives a key from the SEA that it uses to derive access-network specific keys. Furthermore, AMF 1421 can be a termination point of a RAN Control Plane (CP) interface, which can include or be an N2 reference point between the (R)AN 1410 and the AMF 1421; and the AMF 1421 can be a termination point of Non Access Stratum (NAS) (N1) signaling, and perform NAS ciphering and integrity protection.

AMF 1421 can also support NAS signaling with a UE 1401 over an Non-3GPP (N3) Inter Working Function (IWF) interface. The N3IWF can be used to provide access to untrusted entities. N3IWF can be a termination point for the N2 interface between the (R)AN 1410 and the AMF 1421 for the control plane, and can be a termination point for the N3 reference point between the (R)AN 1410 and the UPF 1402 for the user plane. As such, the AMF 1421 can handle N2 signaling from the SMF 1424 and the AMF 1421 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 1401 and AMF 1421 via an N1 reference point between the UE 1401 and the AMF 1421, and relay uplink and downlink user-plane packets between the UE 1401 and UPF 1402. The N3IWF also provides mechanisms for IPsec tunnel establishment with the UE 1401. The AMF 1421 can exhibit an Namf service-based interface, and can be a termination point for an N14 reference point between two AMFs 1421 and an N17 reference point between the AMF 1421 and a 5G Equipment Identity Register (5G-EIR) (not shown in FIG. 14).

The UE 1401 can be registered with the AMF 1421 in order to receive network services. Registration Management (RM) is used to register or deregister the UE 1401 with the network (e.g., AMF 1421), and establish a UE context in the network (e.g., AMF 1421). The UE 1401 can operate in an RM-REGISTERED state or an RM-DEREGISTERED state. In the RM-DEREGISTERED state, the UE 1401 is not registered with the network, and the UE context in AMF 1421 holds no valid location or routing information for the UE 1401 so the UE 1401 is not reachable by the AMF 1421. In the RM-REGISTERED state, the UE 1401 is registered with the network, and the UE context in AMF 1421 can hold a valid location or routing information for the UE 1401 so the UE 1401 is reachable by the AMF 1421. In the RM-REGISTERED state, the UE 1401 can perform mobility Registration Update procedures, perform periodic Registration Update procedures triggered by expiration of the periodic update timer (e.g., to notify the network that the UE 1401 is still active), and perform a Registration Update procedure to update UE capability information or to re-negotiate protocol parameters with the network, among others.

The AMF 1421 can store one or more RM contexts for the UE 1401, where each RM context is associated with a specific access to the network. The RM context can be a data structure, database object, etc. that indicates or stores, inter alia, a registration state per access type and the periodic update timer. The AMF 1421 can also store a 5GC Mobility Management (MM) context that can be the same or similar to an (Enhanced Packet System (EPS))MM ((E)MM) context. In various embodiments, the AMF 1421 can store a Coverage Enhancement (CE) mode B Restriction parameter of the UE 1401 in an associated MM context or RM context. The AMF 1421 can also derive the value, when needed, from the UE's usage setting parameter already stored in the UE context (and/or MM/RM context).

Connection Management (CM) can be used to establish and release a signaling connection between the UE 1401 and the AMF 1421 over the N1 interface. The signaling connection is used to enable NAS signaling exchange between the UE 1401 and the CN 1420, and comprises both the signaling connection between the UE and the AN (e.g., RRC connection or UE-N3IWF connection for non-3GPP access) and the N2 connection for the UE 1401 between the AN (e.g., RAN 1410) and the AMF 1421. The UE 1401 can operate in one of two CM states, CM-IDLE mode or CM-CONNECTED mode. When the UE 1401 is operating in the CM-IDLE state/mode, the UE 1401 may have no NAS signaling connection established with the AMF 1421 over the N1 interface, and there can be (R)AN 1410 signaling connection (e.g., N2 and/or N3 connections) for the UE 1401. When the UE 1401 is operating in the CM-CONNECTED state/mode, the UE 1401 can have an established NAS signaling connection with the AMF 1421 over the N1 interface, and there can be a (R)AN 1410 signaling connection (e.g., N2 and/or N3 connections) for the UE 1401. Establishment of an N2 connection between the (R)AN 1410 and the AMF 1421 can cause the UE 1401 to transition from CM-IDLE mode to CM-CONNECTED mode, and the UE 1401 can transition from the CM-CONNECTED mode to the CM-IDLE mode when N2 signaling between the (R)AN 1410 and the AMF 1421 is released.

The SMF 1424 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 1401 and a data network (DN) 1403 identified by a Data Network Name (DNN). PDU sessions can be established upon UE 1401 request, modified upon UE 1401 and 5GC 1420 request, and released upon UE 1401 and 5GC 1420 request using NAS SM signaling exchanged over the N1 reference point between the UE 1401 and the SMF 1424. Upon request from an application server, the 5GC 1420 can trigger a specific application in the UE 1401. In response to receipt of the trigger message, the UE 1401 can pass the trigger message (or relevant parts/information of the trigger message) to one or more identified applications in the UE 1401. The identified application(s) in the UE 1401 can establish a PDU session to a specific DNN. The SMF 1424 can check whether the UE 1401 requests are compliant with user subscription information associated with the UE 1401. In this regard, the SMF 1424 can retrieve and/or request to receive update notifications on SMF 1424 level subscription data from the UDM 1427.

The SMF 1424 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1424 can be included in the system 1400, which can be between another SMF 1424 in a visited network and the SMF 1424 in the home network in roaming scenarios. Additionally, the SMF 1424 can exhibit the Nsmf service-based interface.

The NEF 1423 can provide means for securely exposing the services and capabilities provided by 3GPP network functions for third party, internal exposure/re-exposure, Application Functions (e.g., AF 1428), edge computing or fog computing systems, etc. In such embodiments, the NEF 1423 can authenticate, authorize, and/or throttle the AFs. NEF 1423 can also translate information exchanged with the AF 1428 and information exchanged with internal network functions. For example, the NEF 1423 can translate between an AF-Service-Identifier and an internal 5GC information. NEF 1423 can also receive information from other network functions (NFs) based on exposed capabilities of other network functions. This information can be stored at the NEF 1423 as structured data, or at a data storage NF using standardized interfaces. The stored information can then be re-exposed by the NEF 1423 to other NFs and AFs, and/or used for other purposes such as analytics. Additionally, the NEF 1423 can exhibit an Nnef service-based interface.

The NRF 1425 can support service discovery functions, receive NF discovery requests from NF instances, and provide the information of the discovered NF instances to the NF instances. NRF 1425 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 1425 can exhibit the Nnrf service-based interface.

The PCF 1426 can provide policy rules to control plane function(s) to enforce them, and can also support unified policy framework to govern network behavior. The PCF 1426 can also implement an FE to access subscription information relevant for policy decisions in a UDR of the UDM 1427. The PCF 1426 can communicate with the AMF 1421 via an N15 reference point between the PCF 1426 and the AMF 1421, which can include a PCF 1426 in a visited network and the AMF 1421 in case of roaming scenarios. The PCF 1426 can communicate with the AF 1428 via an N5 reference point between the PCF 1426 and the AF 1428; and with the SMF 1424 via an N7 reference point between the PCF 1426 and the SMF 1424. The system 1400 and/or CN 1420 can also include an N24 reference point between the PCF 1426 (in the home network) and a PCF 1426 in a visited network. Additionally, the PCF 1426 can exhibit an Npcf service-based interface.

The UDM 1427 can handle subscription-related information to support the network entities' handling of communication sessions, and can store subscription data of UE 1401. For example, subscription data can be communicated between the UDM 1427 and the AMF 1421 via an N8 reference point between the UDM 1427 and the AMF. The UDM 1427 can include two parts, an application Functional Entity (FE) and a Unified Data Repository (UDR) (the FE and UDR are not shown in FIG. 1). The UDR can store subscription data and policy data for the UDM 1427 and the PCF 1426, and/or structured data for exposure and application data (including Packet Flow Descriptions (PFDs) for application detection, application request information for multiple UEs 1401) for the NEF 1423. The Nudr service-based interface can be exhibited by the UDR 221 to allow the UDM 1427, PCF 1426, and NEF 1423 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 1424 via an N10 reference point between the UDM 1427 and the SMF 1424. UDM 1427 can also support SMS management, wherein an SMS-FE implements similar application logic as discussed elsewhere herein. Additionally, the UDM 1427 can exhibit the Nudm service-based interface.

The AF 1428 can provide application influence on traffic routing, provide access to NEF 1423, and interact with the policy framework for policy control. 5GC 1420 and AF 1428 can provide information to each other via NEF 1423, which can be used for edge computing implementations. In such implementations, the network operator and third party services can be hosted close to the UE 1401 access point of attachment to achieve an efficient service delivery through the reduced end-to-end latency and load on the transport network. For edge computing implementations, the 5GC can select a UPF 1402 close to the UE 1401 and execute traffic steering from the UPF 1402 to DN 1403 via the N6 interface. This can be based on the UE subscription data, UE location, and information provided by the AF 1428. In this way, the AF 1428 can influence UPF (re)selection and traffic routing. Based on operator deployment, when AF 1428 is considered to be a trusted entity, the network operator can permit AF 1428 to interact directly with relevant NFs. Additionally, the AF 1428 can exhibit an Naf service-based interface.

The NSSF 1429 can select a set of network slice instances serving the UE 1401. The NSSF 1429 can also determine allowed Network Slice Selection Assistance Information (NSSAI) and the mapping to the subscribed Single NSSAIs (S-NSSAIs), as appropriate. The NSSF 1429 can also determine the AMF set to be used to serve the UE 1401, or a list of candidate AMF(s) 1421 based on a suitable configuration and possibly by querying the NRF 1425. The selection of a set of network slice instances for the UE 1401 can be triggered by the AMF 1421 with which the UE 1401 is registered by interacting with the NSSF 1429, which can lead to a change of AMF 1421. The NSSF 1429 can interact with the AMF 1421 via an N22 reference point between AMF 1421 and NSSF 1429; and can communicate with another NSSF 1429 in a visited network via an N31 reference point (not shown in FIG. 14). Additionally, the NSSF 1429 can exhibit an Nnssf service-based interface.

As discussed previously, the CN 1420 can include an SMSF, which can be responsible for SMS subscription checking and verification, and relaying SM messages to/from the UE 1401 to/from other entities, such as an SMS-Gateway Mobile services Switching Center (GMSC)/Inter-Working MSC (IWMSC)/SMS-router. The SMSF can also interact with AMF 1421 and UDM 1427 for a notification procedure that the UE 1401 is available for SMS transfer (e.g., set a UE not reachable flag, and notifying UDM 1427 when UE 1401 is available for SMS).

The CN 1420 can also include other elements that are not shown in FIG. 14, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 14 for clarity. In one example, the CN 1420 can include an Nx interface, which is an inter-CN interface between the MME (e.g., a non-5G MME) and the AMF 1421 in order to enable interworking between CN 1420 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 15:
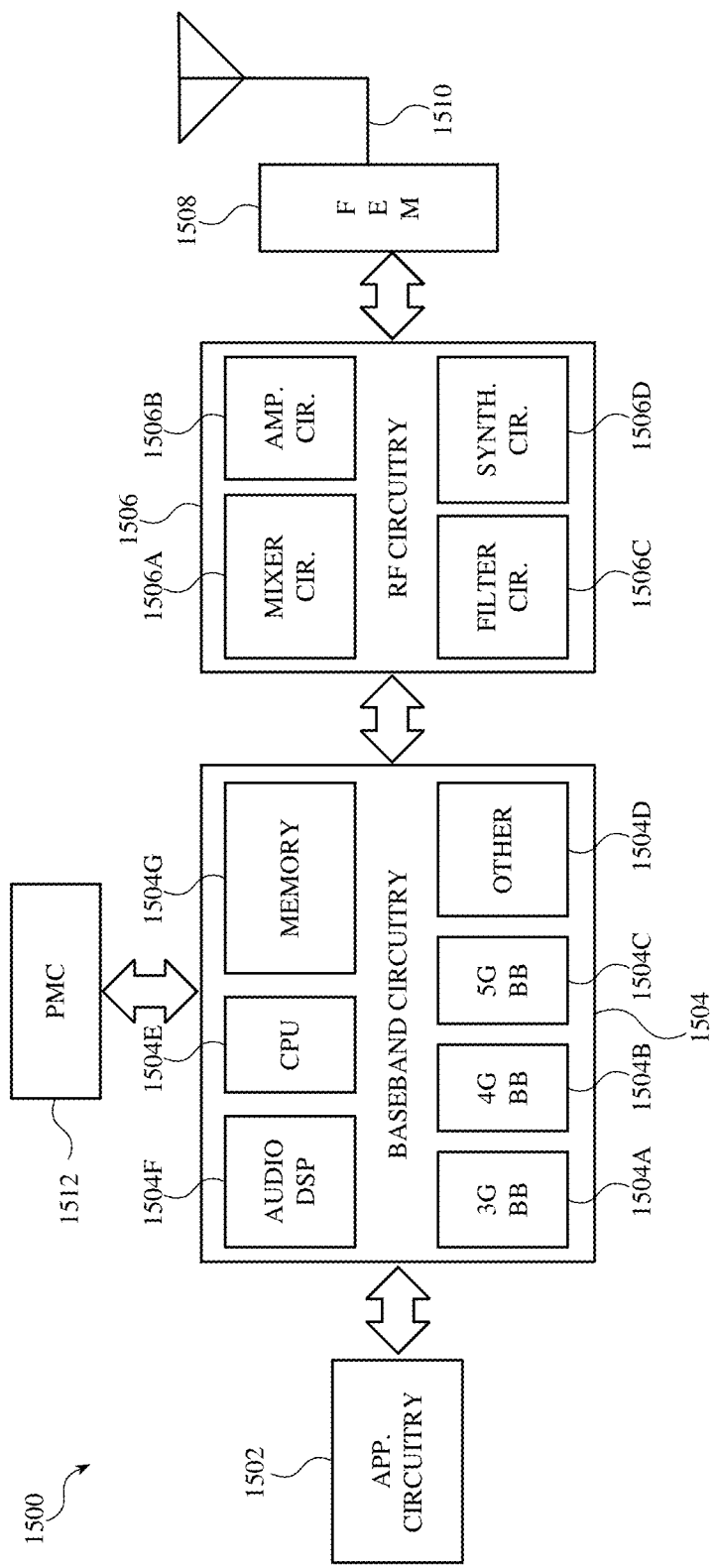
FIG. 15 illustrates example components of a device in accordance with some embodiments.

FIG. 15 illustrates example components of a device 1500 in accordance with some embodiments. In some embodiments, the device 1500 can include application circuitry 1502, baseband circuitry 1504, Radio Frequency (RF) circuitry 1506, front-end module (FEM) circuitry 1508, one or more antennas 1510, and power management circuitry (PMC) 1512 coupled together at least as shown. The components of the illustrated device 1500 can be included in a UE or a RAN node. In some embodiments, the device 1500 can include fewer elements (e.g., a RAN node may not utilize application circuitry 1502, and instead include a processor/controller to process IP data received from a CN such as 5GC 1420 or an Evolved Packet Core (EPC)). In some embodiments, the device 1500 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 1502 can include one or more application processors. For example, the application circuitry 1502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1500. In some embodiments, processors of application circuitry 1502 can process IP data packets received from an EPC.

The baseband circuitry 1504 can include circuitry such as, but not limited to, one or more single-core or multi-core processors. The baseband circuitry 1504 can include one or more baseband processors or control logic to process baseband signals received from a receive signal path of the RF circuitry 1506 and to generate baseband signals for a transmit signal path of the RF circuitry 1506. Baseband circuitry 1504 can interface with the application circuitry 1502 for generation and processing of the baseband signals and for controlling operations of the RF circuitry 1506. For example, in some embodiments, the baseband circuitry 1504 can include a third generation (3G) baseband processor 1504A, a fourth generation (4G) baseband processor 1504B, a fifth generation (5G) baseband processor 1504C, or other baseband processor(s) 1504D for other existing generations, generations in development or to be developed in the future (e.g., second generation (2G), sixth generation (6G), etc.). The baseband circuitry 1504 (e.g., one or more of baseband processors 1504A-D) can handle various radio control functions that enable communication with one or more radio networks via the RF circuitry 1506. In other embodiments, some or all of the functionality of baseband processors 1504A-D can be included in modules stored in the memory 1504G and executed via a Central Processing Unit (CPU) 1504E. The radio control functions can include, but are not limited to, signal modulation/demodulation, encoding/decoding, radio frequency shifting, etc. In some embodiments, modulation/demodulation circuitry of the baseband circuitry 1504 can include Fast-Fourier Transform (FFT), precoding, or constellation mapping/demapping functionality. In some embodiments, encoding/decoding circuitry of the baseband circuitry 1504 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 1504 can include one or more audio digital signal processor(s) (DSP) 1504F. The audio DSP(s) 1504F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 1504 and the application circuitry 1502 can be implemented together such as, for example, on a system on a chip (SOC).

In some embodiments, the baseband circuitry 1504 can provide for communication compatible with one or more radio technologies. For example, in some embodiments, the baseband circuitry 1504 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 1504 is configured to support radio communications of more than one wireless protocol can be referred to as multi-mode baseband circuitry.

RF circuitry 1506 can enable communication with wireless networks using modulated electromagnetic radiation through a non-solid medium. In various embodiments, the RF circuitry 1506 can include switches, filters, amplifiers, etc. to facilitate the communication with the wireless network. RF circuitry 1506 can include a receive signal path which can include circuitry to down-convert RF signals received from the FEM circuitry 1508 and provide baseband signals to the baseband circuitry 1504. RF circuitry 1506 can also include a transmit signal path which can include circuitry to up-convert baseband signals provided by the baseband circuitry 1504 and provide RF output signals to the FEM circuitry 1508 for transmission.

In some embodiments, the receive signal path of the RF circuitry 1506 can include mixer circuitry 1506a, amplifier circuitry 1506b and filter circuitry 1506c. In some embodiments, the transmit signal path of the RF circuitry 1506 can include filter circuitry 1506c and mixer circuitry 1506a. RF circuitry 1506 can also include synthesizer circuitry 1506d for synthesizing a frequency for use by the mixer circuitry 1506a of the receive signal path and the transmit signal path. In some embodiments, the mixer circuitry 1506a of the receive signal path can be configured to down-convert RF signals received from the FEM circuitry 1508 based on the synthesized frequency provided by synthesizer circuitry 1506d. The amplifier circuitry 1506b can be configured to amplify the down-converted signals and the filter circuitry 1506c can be a low-pass filter (LPF) or band-pass filter (BPF) configured to remove unwanted signals from the down-converted signals to generate output baseband signals. Output baseband signals can be provided to the baseband circuitry 1504 for further processing. In some embodiments, the output baseband signals can be zero-frequency baseband signals, although this is not a requirement. In some embodiments, mixer circuitry 1506a of the receive signal path can comprise passive mixers, although the scope of the embodiments is not limited in this respect.

In some embodiments, the mixer circuitry 1506a of the transmit signal path can be configured to up-convert input baseband signals based on the synthesized frequency provided by the synthesizer circuitry 1506d to generate RF output signals for the FEM circuitry 1508. The baseband signals can be provided by the baseband circuitry 1504 and can be filtered by filter circuitry 1506c.

In some embodiments, the mixer circuitry 1506a of the receive signal path and the mixer circuitry 1506a of the transmit signal path can include two or more mixers and can be arranged for quadrature downconversion and upconversion, respectively. In some embodiments, the mixer circuitry 1506a of the receive signal path and the mixer circuitry 1506a of the transmit signal path can include two or more mixers and can be arranged for image rejection (e.g., Hartley image rejection). In some embodiments, the mixer circuitry 1506a of the receive signal path and the mixer circuitry 1506a can be arranged for direct downconversion and direct upconversion, respectively. In some embodiments, the mixer circuitry 1506a of the receive signal path and the mixer circuitry 1506a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 1506 can include analog-to-digital converter (ADC) and digital-to-analog converter (DAC) circuitry and the baseband circuitry 1504 can include a digital baseband interface to communicate with the RF circuitry 1506.

In some dual-mode embodiments, a separate radio IC circuitry can be provided for processing signals for each spectrum, although the scope of the embodiments is not limited in this respect.

In some embodiments, the synthesizer circuitry 1506d can be a fractional-N synthesizer or a fractional N/N+1 synthesizer, although the scope of the embodiments is not limited in this respect as other types of frequency synthesizers can be suitable. For example, synthesizer circuitry 1506d can be a delta-sigma synthesizer, a frequency multiplier, or a synthesizer comprising a phase-locked loop with a frequency divider.

The synthesizer circuitry 1506d can be configured to synthesize an output frequency for use by the mixer circuitry 1506a of the RF circuitry 1506 based on a frequency input and a divider control input. In some embodiments, the synthesizer circuitry 1506d can be a fractional N/N+1 synthesizer.

In some embodiments, frequency input can be provided by a voltage controlled oscillator (VCO), although that is not a requirement. Divider control input can be provided by either the baseband circuitry 1504 or the applications circuitry 1502 depending on the desired output frequency. In some embodiments, a divider control input (e.g., N) can be determined from a look-up table based on a channel indicated by the applications circuitry 1502.

Synthesizer circuitry 1506d of the RF circuitry 1506 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1506 can include an IQ/polar converter.

FEM circuitry 1508 can include a receive signal path which can include circuitry configured to operate on RF signals received from one or more antennas 1510, amplify the received signals and provide the amplified versions of the received signals to the RF circuitry 1506 for further processing. FEM circuitry 1508 can also include a transmit signal path which can include circuitry configured to amplify signals for transmission provided by the RF circuitry 1506 for transmission by one or more of the one or more antennas 1510. In various embodiments, the amplification through the transmit or receive signal paths can be done solely in the RF circuitry 1506, solely in the FEM circuitry 1508, or in both the RF circuitry 1506 and the FEM circuitry 1508.

In some embodiments, the FEM circuitry 1508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1506). The transmit signal path of the FEM circuitry 1508 can include a power amplifier (PA) to amplify input RF signals (e.g., provided by RF circuitry 1506), and one or more filters to generate RF signals for subsequent transmission (e.g., by one or more of the one or more antennas 1510).

In some embodiments, the PMC 1512 can manage power provided to the baseband circuitry 1504. In particular, the PMC 1512 can control power-source selection, voltage scaling, battery charging, or DC-to-DC conversion. The PMC 1512 can often be included when the device 1500 is capable of being powered by a battery, for example, when the device is included in a UE. The PMC 1512 can increase the power conversion efficiency while providing desirable implementation size and heat dissipation characteristics.

While FIG. 15 shows the PMC 1512 coupled only with the baseband circuitry 1504. However, in other embodiments, the PMC 1512 may be additionally or alternatively coupled with, and perform similar power management operations for, other components such as, but not limited to, application circuitry 1502, RF circuitry 1506, or FEM circuitry 1508.

In some embodiments, the PMC 1512 can control, or otherwise be part of, various power saving mechanisms of the device 1500. For example, if the device 1500 is in an RRC_Connected state, where it is still connected to the RAN node as it expects to receive traffic shortly, then it can enter a state known as Discontinuous Reception Mode (DRX) after a period of inactivity. During this state, the device 1500 can power down for brief intervals of time and thus save power.

If there is no data traffic activity for an extended period of time, then the device 1500 can transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1502 and processors of the baseband circuitry 1504 can be used to execute elements of one or more instances of a protocol stack. For example, processors of the baseband circuitry 1504, alone or in combination, can be used execute Layer 3, Layer 2, or Layer 1 functionality, while processors of the application circuitry 1502 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 16:
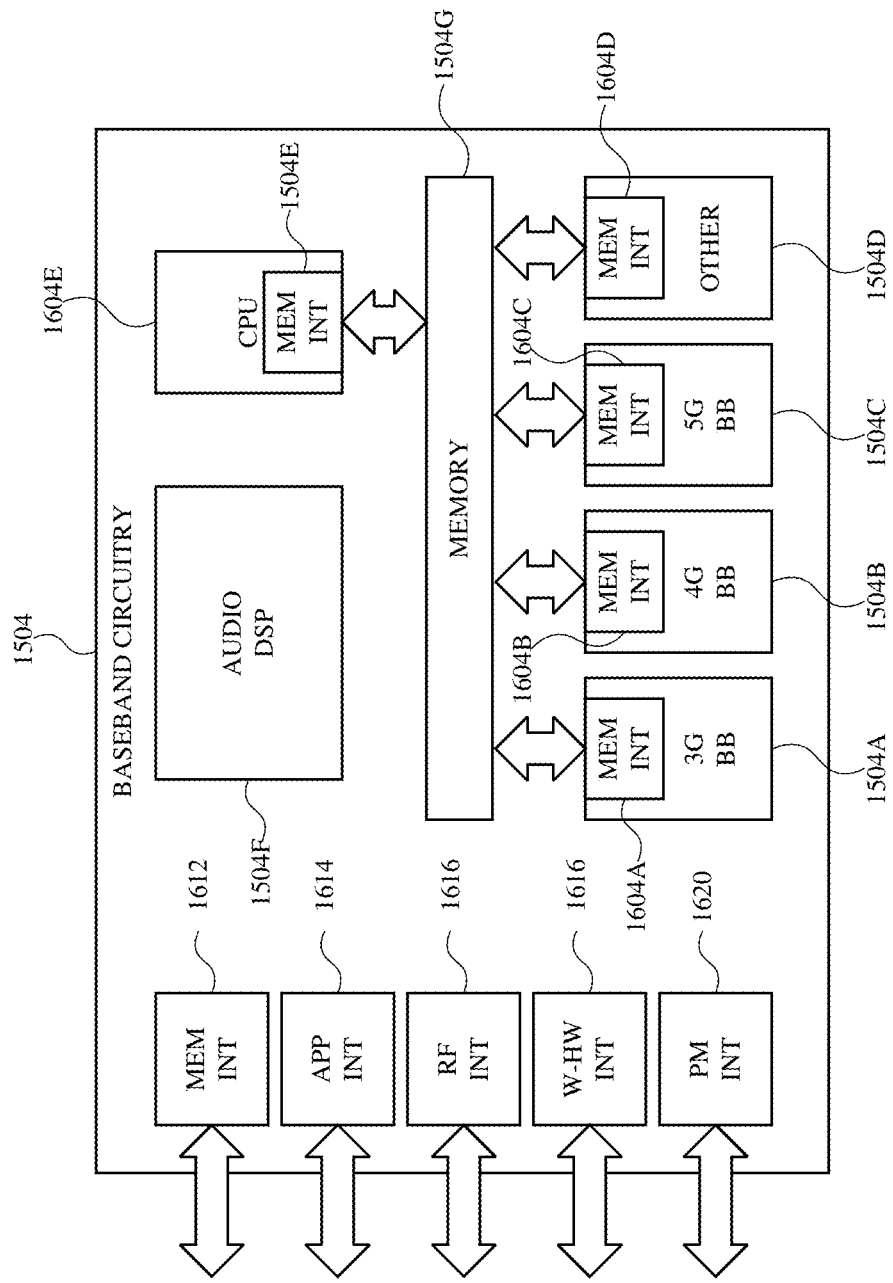
FIG. 16 illustrates example interfaces of baseband circuitry in accordance with some embodiments.

FIG. 16 illustrates example interfaces of baseband circuitry in accordance with some embodiments. As discussed above, the baseband circuitry 1504 of FIG. 2 can comprise processors 1504A-1504E and a memory 1504G utilized by said processors. Each of the processors 1504A-1504E can include a memory interface, 1604A-1604E, respectively, to send/receive data to/from the memory 1504G.

The baseband circuitry 1504 can further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 2), an RF circuitry interface 1616 (e.g., an interface to send/receive data to/from RF circuitry 1506 of FIG. 2), a wireless hardware connectivity interface 1618 (e.g., an interface to send/receive data to/from Near Field Communication (NFC) components, Bluetooth® components (e.g., Bluetooth® Low Energy), Wi-Fi® components, and other communication components), and a power management interface 1620 (e.g., an interface to send/receive power or control signals to/from the PMC 1512).

In various aspects, embodiments discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a user equipment (UE) comprising a processor (or processing circuitry) configured to perform operations comprising receiving a hybrid automatic repeat request process group (HPG) configuration signal from a base station associated therewith, wherein the HPG configuration signal comprises information of a plurality HARQ process groups (HPGs), each HPG comprising one or more HARQ processes of a set of HARQ processes configured for the UE; determining the plurality of HPGs, based on processing the HPG configuration signal; receiving a downlink control information (DCI) from the base station, wherein the DCI is configured to trigger a HARQ-ACK feedback signal from the UE and wherein the DCI comprises information that identifies one or more HPGs of the plurality of HPGs, the HARQ-ACK feedback information of which are to be included in the HARQ-ACK feedback signal; generating the HARQ-ACK feedback signal comprising the HARQ-ACK feedback information of HARQ processes associated with the one or more HPGs; and sending the HARQ-ACK feedback signal to the base station.

Example 2 is a UE, including the subject matter of example 1, wherein the plurality of HPGs are associated with a respective plurality of priority class indices, wherein each priority class index of the plurality of priority class indices corresponds to a priority index associated with the one or more HARQ processes of the respective HPG.

Example 3 is a UE, including the subject matter of examples 1-2, including or omitting elements, wherein the DCI comprises an HPG request field comprising an HPG request field value that identifies the one or more HPGs and wherein the processor is configured to determine the one or more HPGs based on a predefined mapping between the HPG request field value and the one or more HPGs.

Example 4 is a UE, including the subject matter of examples 1-3, including or omitting elements, wherein the DCI comprises cyclic redundancy check (CRC) bits that are scrambled by a predefined HPG sequence, wherein the predefined HPG sequence identifies the one or more HPGs, and wherein the processor is configured to descramble the CRC bits to determine the predefined HPG sequence and determine the one or more HPGs, based on the predefined HPG sequence, in accordance with a predefined mapping between the predefined HPG sequence and the one or more HPGs.

Example 5 is a UE, including the subject matter of examples 1-4, including or omitting elements, wherein the DCI comprises a priority indicator field that comprises a select priority class index of the plurality of priority class indices, wherein the select priority class index identifies a select HPG, the HARQ-ACK feedback information of which is to be included in the HARQ-ACK feedback signal.

Example 6 is a UE, including the subject matter of examples 1-5, including or omitting elements, wherein the HARQ-ACK feedback signal further includes a latest new data indicator (NDI) value detected by the UE for each of the HARQ processes associated with the one or more HPGs.

Example 7 is a UE, including the subject matter of examples 1-6, including or omitting elements, wherein the operations further comprise receiving an NDI configuration signal from the BS, wherein the NDI configuration signal is adapted to configure the UE to include the NDI as part of the HARQ-ACK feedback signal.

Example 8 is a UE, including the subject matter of examples 1-7, including or omitting elements, wherein the one or more processors is further configured to receive a HARQ process regrouping signal from the base station, wherein the HARQ process regrouping signal comprises information to regroup the HARQ processes associated with one or more HPGs of the plurality of HPGs.

Example 9 is a UE, including the subject matter of examples 1-8, including or omitting elements, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

Example 10 is a UE, including the subject matter of examples 1-9, including or omitting elements, wherein the HARQ process regrouping signal comprises a HARQ regroup media access control (MAC) control element (CE) comprising one or more sets of H-fields respectively associated with one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

Example 11 is a base station (BS) comprising a processor (or processing circuitry) configured to perform operations comprising sending a hybrid automatic repeat request process group (HPG) configuration signal to a user equipment (UE) associated therewith, wherein the HPG configuration signal comprises information of a plurality HARQ process groups (HPGs), each HPG comprising one or more HARQ processes of a set of HARQ processes configured for the UE; sending a downlink control information (DCI) to the UE, wherein the DCI is configured to trigger a HARQ-ACK feedback signal from the UE and wherein the DCI comprises information that identifies one or more HPGs of the plurality of HPGs, HARQ-ACK feedback information of which are to be included in the HARQ-ACK feedback signal; and receiving the HARQ-ACK feedback signal from the UE, wherein the HARQ-ACK feedback signal comprises the HARQ-ACK feedback information of HARQ processes associated with the one or more HPGs.

Example 12 is a BS, including the subject matter of example 11, wherein the plurality of HPGs are associated with a respective plurality of priority class indices, wherein each priority class index of the plurality of priority class indices corresponds to a priority index associated with the one or more HARQ processes of the respective HPG.

Example 13 is a BS, including the subject matter of examples 11-12, including or omitting elements, wherein the DCI comprises an HPG request field comprising an HPG request field value that identifies the one or more HPGs based on a predefined mapping between the HPG request field value and the one or more HPGs.

Example 14 is a BS, including the subject matter of examples 11-13, including or omitting elements, wherein the DCI comprises cyclic redundancy check (CRC) bits that are scrambled by a predefined HPG sequence, wherein the predefined HPG sequence identifies the one or more HPGs, in accordance with a predefined mapping between the predefined HPG sequence and the one or more HPGs.

Example 15 is a BS, including the subject matter of examples 11-14, including or omitting elements, wherein the DCI comprises a priority indicator field that comprises a select priority class index of the plurality of priority class indices, wherein the select priority class index identifies a select HPG, the HARQ-ACK feedback information of which is to be included in the HARQ-ACK feedback signal.

Example 16 is a BS, including the subject matter of examples 11-15, including or omitting elements, wherein the HARQ-ACK feedback signal further includes a latest new data indicator (NDI) value detected by the UE for each of the HARQ processes associated with the one or more HPGs.

Example 17 is a BS, including the subject matter of examples 11-16, including or omitting elements, wherein the operations further comprise generating an NDI configuration signal to be provided to the UE, wherein the NDI configuration signal is adapted to configure the UE to include the NDI as part of the HARQ-ACK feedback signal; and sending the NDI configuration signal to the UE.

Example 18 is a BS, including the subject matter of examples 11-17, including or omitting elements, wherein the operations further comprise generating a HARQ process regrouping signal to be provided to the UE, wherein the HARQ process regrouping signal comprises information to regroup the HARQ processes associated with one or more HPGs of the plurality of HPGs; and sending the HARQ process regrouping signal to the UE.

Example 19 is a BS, including the subject matter of examples 11-18, including or omitting elements, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

Example 20 is a BS, including the subject matter of examples 11-19, including or omitting elements, wherein the HARQ process regrouping signal comprises a HARQ regroup media access control (MAC) control element (CE) comprising one or more sets of H-fields respectively associated with one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

Example 21 is a baseband (BB) processor for a user equipment (UE) configured to perform operations comprising receiving a hybrid automatic repeat request process group (HPG) configuration signal from a base station associated therewith, wherein the HPG configuration signal comprises information of a plurality HARQ process groups (HPGs), each HPG comprising one or more HARQ processes of a set of HARQ processes configured for the UE; determining the plurality of HPGs, based on processing the HPG configuration signal; receiving a downlink control information (DCI) from the base station, wherein the DCI is configured to trigger a HARQ-ACK feedback signal from the UE and wherein the DCI comprises information that identifies one or more HPGs of the plurality of HPGs, the HARQ-ACK feedback information of which are to be included in the HARQ-ACK feedback signal; generating the HARQ-ACK feedback signal comprising the HARQ-ACK feedback information of HARQ processes associated with the one or more HPGs; and sending the HARQ-ACK feedback signal to the base station.

Example 22 is a BB processor, including the subject matter of example 21, wherein the plurality of HPGs are associated with a respective plurality of priority class indices, wherein each priority class index of the plurality of priority class indices corresponds to a priority index associated with the one or more HARQ processes of the respective HPG.

Example 23 is a BB processor, including the subject matter of examples 21-22, including or omitting elements, wherein the DCI comprises an HPG request field comprising an HPG request field value that identifies the one or more HPGs and wherein the processor is configured to determine the one or more HPGs based on a predefined mapping between the HPG request field value and the one or more HPGs.

Example 24 is a BB processor, including the subject matter of examples 21-23, including or omitting elements, wherein the DCI comprises cyclic redundancy check (CRC) bits that are scrambled by a predefined HPG sequence, wherein the predefined HPG sequence identifies the one or more HPGs, and wherein the processor is configured to descramble the CRC bits to determine the predefined HPG sequence and determine the one or more HPGs, based on the predefined HPG sequence, in accordance with a predefined mapping between the predefined HPG sequence and the one or more HPGs.

Example 25 is a BB processor, including the subject matter of examples 21-24, including or omitting elements, wherein the DCI comprises a priority indicator field that comprises a select priority class index of the plurality of priority class indices, wherein the select priority class index identifies a select HPG, the HARQ-ACK feedback information of which is to be included in the HARQ-ACK feedback signal.

Example 26 is a BB processor, including the subject matter of examples 21-25, including or omitting elements, wherein the HARQ-ACK feedback signal further includes a latest new data indicator (NDI) value detected by the UE for each of the HARQ processes associated with the one or more HPGs.

Example 27 is a BB processor, including the subject matter of examples 21-26, including or omitting elements, wherein the operations further comprise receiving an NDI configuration signal from the BS, wherein the NDI configuration signal is adapted to configure the UE to include the NDI as part of the HARQ-ACK feedback signal.

Example 28 is a BB processor, including the subject matter of examples 21-27, including or omitting elements, wherein the one or more processors is further configured to receive a HARQ process regrouping signal from the base station, wherein the HARQ process regrouping signal comprises information to regroup the HARQ processes associated with one or more HPGs of the plurality of HPGs.

Example 29 is a BB processor, including the subject matter of examples 21-28, including or omitting elements, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

Example 30 is a BB processor, including the subject matter of examples 21-29, including or omitting elements, wherein the HARQ process regrouping signal comprises a HARQ regroup media access control (MAC) control element (CE) comprising one or more sets of H-fields respectively associated with one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

Example 31 is a baseband (BB) processor for a base station (BS) configured to perform operations comprising sending a hybrid automatic repeat request process group (HPG) configuration signal to a user equipment (UE) associated therewith, wherein the HPG configuration signal comprises information of a plurality HARQ process groups (HPGs), each HPG comprising one or more HARQ processes of a set of HARQ processes configured for the UE; sending a downlink control information (DCI) to the UE, wherein the DCI is configured to trigger a HARQ-ACK feedback signal from the UE and wherein the DCI comprises information that identifies one or more HPGs of the plurality of HPGs, HARQ-ACK feedback information of which are to be included in the HARQ-ACK feedback signal; and receiving the HARQ-ACK feedback signal from the UE, wherein the HARQ-ACK feedback signal comprises the HARQ-ACK feedback information of HARQ processes associated with the one or more HPGs.

Example 32 is a BB processor, including the subject matter of example 31, wherein the plurality of HPGs are associated with a respective plurality of priority class indices, wherein each priority class index of the plurality of priority class indices corresponds to a priority index associated with the one or more HARQ processes of the respective HPG.

Example 33 is a BB processor, including the subject matter of examples 31-32, including or omitting elements, wherein the DCI comprises an HPG request field comprising an HPG request field value that identifies the one or more HPGs based on a predefined mapping between the HPG request field value and the one or more HPGs.

Example 34 is a BB processor, including the subject matter of examples 31-33, including or omitting elements, wherein the DCI comprises cyclic redundancy check (CRC) bits that are scrambled by a predefined HPG sequence, wherein the predefined HPG sequence identifies the one or more HPGs, in accordance with a predefined mapping between the predefined HPG sequence and the one or more HPGs.

Example 35 is a BB processor, including the subject matter of examples 31-34, including or omitting elements, wherein the DCI comprises a priority indicator field that comprises a select priority class index of the plurality of priority class indices, wherein the select priority class index identifies a select HPG, the HARQ-ACK feedback information of which is to be included in the HARQ-ACK feedback signal.

Example 36 is a BB processor, including the subject matter of examples 31-35, including or omitting elements, wherein the HARQ-ACK feedback signal further includes a latest new data indicator (NDI) value detected by the UE for each of the HARQ processes associated with the one or more HPGs.

Example 37 is a BB processor, including the subject matter of examples 31-36, including or omitting elements, wherein the operations further comprise generating an NDI configuration signal to be provided to the UE, wherein the NDI configuration signal is adapted to configure the UE to include the NDI as part of the HARQ-ACK feedback signal; and sending the NDI configuration signal to the UE.

Example 38 is a BB processor, including the subject matter of examples 31-37, including or omitting elements, wherein the operations further comprise generating a HARQ process regrouping signal to be provided to the UE, wherein the HARQ process regrouping signal comprises information to regroup the HARQ processes associated with one or more HPGs of the plurality of HPGs; and sending the HARQ process regrouping signal to the UE.

Example 39 is a BB processor, including the subject matter of examples 31-38, including or omitting elements, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

Example 40 is a BB processor, including the subject matter of examples 31-39, including or omitting elements, wherein the HARQ process regrouping signal comprises a HARQ regroup media access control (MAC) control element (CE) comprising one or more sets of H-fields respectively associated with one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

Example 41 is a method for a user equipment (UE) comprising receiving a hybrid automatic repeat request process group (HPG) configuration signal from a base station associated therewith, using one or more processors, wherein the HPG configuration signal comprises information of a plurality HARQ process groups (HPGs), each HPG comprising one or more HARQ processes of a set of HARQ processes configured for the UE; determining the plurality of HPGs, based on processing the HPG configuration signal, using the one or more processors; receiving a downlink control information (DCI) from the base station, using the one or more processors, wherein the DCI is configured to trigger a HARQ-ACK feedback signal from the UE and wherein the DCI comprises information that identifies one or more HPGs of the plurality of HPGs, the HARQ-ACK feedback information of which are to be included in the HARQ-ACK feedback signal; generating the HARQ-ACK feedback signal comprising the HARQ-ACK feedback information of HARQ processes associated with the one or more HPGs, using the one or more processors; and sending the HARQ-ACK feedback signal to the base station, using the one or more processors.

Example 42 is a method, including the subject matter of example 41, wherein the plurality of HPGs are associated with a respective plurality of priority class indices, wherein each priority class index of the plurality of priority class indices corresponds to a priority index associated with the one or more HARQ processes of the respective HPG.

Example 43 is a method, including the subject matter of examples 41-42, including or omitting elements, wherein the DCI comprises an HPG request field comprising an HPG request field value that identifies the one or more HPGs and wherein the processor is configured to determine the one or more HPGs based on a predefined mapping between the HPG request field value and the one or more HPGs.

Example 44 is a method, including the subject matter of examples 41-43, including or omitting elements, wherein the DCI comprises cyclic redundancy check (CRC) bits that are scrambled by a predefined HPG sequence, wherein the predefined HPG sequence identifies the one or more HPGs, and wherein the processor is configured to descramble the CRC bits to determine the predefined HPG sequence and determine the one or more HPGs, based on the predefined HPG sequence, in accordance with a predefined mapping between the predefined HPG sequence and the one or more HPGs.

Example 45 is a method, including the subject matter of examples 41-44, including or omitting elements, wherein the DCI comprises a priority indicator field that comprises a select priority class index of the plurality of priority class indices, wherein the select priority class index identifies a select HPG, the HARQ-ACK feedback information of which is to be included in the HARQ-ACK feedback signal.

Example 46 is a method, including the subject matter of examples 41-45, including or omitting elements, wherein the HARQ-ACK feedback signal further includes a latest new data indicator (NDI) value detected by the UE for each of the HARQ processes associated with the one or more HPGs.

Example 47 is a method, including the subject matter of examples 41-46, including or omitting elements, further comprising receiving an NDI configuration signal from the BS, using the one or more processors, wherein the NDI configuration signal is adapted to configure the UE to include the NDI as part of the HARQ-ACK feedback signal.

Example 48 is a method, including the subject matter of examples 41-47, including or omitting elements, further comprising receiving a HARQ process regrouping signal from the base station, using the one or more processors, wherein the HARQ process regrouping signal comprises information to regroup the HARQ processes associated with one or more HPGs of the plurality of HPGs.

Example 49 is a method, including the subject matter of examples 41-48, including or omitting elements, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

Example 50 is a method, including the subject matter of examples 41-49, including or omitting elements, wherein the HARQ process regrouping signal comprises a HARQ regroup media access control (MAC) control element (CE) comprising one or more sets of H-fields respectively associated with one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

Example 51 is a method for a base station (BS) comprising sending a hybrid automatic repeat request process group (HPG) configuration signal to a user equipment (UE) associated therewith, using one or more processors, wherein the HPG configuration signal comprises information of a plurality HARQ process groups (HPGs), each HPG comprising one or more HARQ processes of a set of HARQ processes configured for the UE; sending a downlink control information (DCI) to the UE, using the one or more processors, wherein the DCI is configured to trigger a HARQ-ACK feedback signal from the UE and wherein the DCI comprises information that identifies one or more HPGs of the plurality of HPGs, HARQ-ACK feedback information of which are to be included in the HARQ-ACK feedback signal; and receiving the HARQ-ACK feedback signal from the UE, using the one or more processors, wherein the HARQ-ACK feedback signal comprises the HARQ-ACK feedback information of HARQ processes associated with the one or more HPGs.

Example 52 is a method, including the subject matter of example 51, wherein the plurality of HPGs are associated with a respective plurality of priority class indices, wherein each priority class index of the plurality of priority class indices corresponds to a priority index associated with the one or more HARQ processes of the respective HPG.

Example 53 is a method, including the subject matter of examples 51-52, including or omitting elements, wherein the DCI comprises an HPG request field comprising an HPG request field value that identifies the one or more HPGs based on a predefined mapping between the HPG request field value and the one or more HPGs.

Example 54 is a method, including the subject matter of examples 51-53, including or omitting elements, wherein the DCI comprises cyclic redundancy check (CRC) bits that are scrambled by a predefined HPG sequence, wherein the predefined HPG sequence identifies the one or more HPGs, in accordance with a predefined mapping between the predefined HPG sequence and the one or more HPGs.

Example 55 is a method, including the subject matter of examples 51-54, including or omitting elements, wherein the DCI comprises a priority indicator field that comprises a select priority class index of the plurality of priority class indices, wherein the select priority class index identifies a select HPG, the HARQ-ACK feedback information of which is to be included in the HARQ-ACK feedback signal.

Example 56 is a method, including the subject matter of examples 51-55, including or omitting elements, wherein the HARQ-ACK feedback signal further includes a latest new data indicator (NDI) value detected by the UE for each of the HARQ processes associated with the one or more HPGs.

Example 57 is a method, including the subject matter of examples 51-56, including or omitting elements, further comprising generating an NDI configuration signal to be provided to the UE, using the one or more processors, wherein the NDI configuration signal is adapted to configure the UE to include the NDI as part of the HARQ-ACK feedback signal; and sending the NDI configuration signal to the UE, using the one or more processors.

Example 58 is a method, including the subject matter of examples 51-57, including or omitting elements, further comprising generating a HARQ process regrouping signal to be provided to the UE, using the one or more processors, wherein the HARQ process regrouping signal comprises information to regroup the HARQ processes associated with one or more HPGs of the plurality of HPGs; and sending the HARQ process regrouping signal to the UE, using the one or more processors.

Example 59 is a method, including the subject matter of examples 51-58, including or omitting elements, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

Example 60 is a method, including the subject matter of examples 51-59, including or omitting elements, wherein the HARQ process regrouping signal comprises a HARQ regroup media access control (MAC) control element (CE) comprising one or more sets of H-fields respectively associated with one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

Example 61 is a user equipment (UE) device comprising a processor (or processing circuitry) configured to perform operations comprising receiving a downlink control information (DCI) from a base station associated therewith, wherein the DCI comprises an indication to trigger a Type-3 hybrid automatic repeat request (HARQ) acknowledgement (ACK) feedback signal; generating the Type-3 HARQ ACK feedback signal, based on processing the DCI, wherein the Type-3 HARQ ACK feedback signal comprises one or more HARQ-ACK bits for semi-persistent scheduling (SPS) physical downlink shared channel (PDSCH) release(s) and wherein each of the one or more HARQ-ACK bits for SPS PDSCH release(s) is adapted to include HARQ-ACK information for an SPS PDSCH release associated with the UE; and sending the Type-3 HARQ-ACK feedback signal to the base station.

Example 62 is a UE, including the subject matter of example 61, wherein the one or more HARQ-ACK bits for SPS PDSCH release(s) comprises one or more reserved bits that are reserved to include HARQ-ACK information for one or more SPS PDSCH release(s), respectively.

Example 63 is a UE, including the subject matter of examples 61-62, including or omitting elements, wherein the DCI further includes information of the number of reserved bits comprising the one or more reserved bits for SPS PDSCH release(s) that are to be included in the Type-3 HARQ-ACK feedback signal.

Example 64 is a UE, including the subject matter of examples 61-63, including or omitting elements, wherein the DCI further includes a total SPS release indicator (T-SRI) field comprising information that enables to identify a total number of reserved bits comprising the one or more reserved bits for SPS PDSCH release(s) that are to be included within the Type-3 HARQ ACK feedback signal.

Example 65 is a UE, including the subject matter of examples 61-64, including or omitting elements, wherein the T-SRI field comprises a 1-bit field comprising an SPS release indicator value that indicates whether reserved bits for SPS PDSCH release(s) are included in Type-3 HARQ ACK feedback signal or not.

Example 66 is a UE, including the subject matter of examples 61-65, including or omitting elements, wherein, when the SPS release indicator value indicates that the reserved bits for SPS PDSCH release(s) are included, the total number of reserved bits is determined based on a total number of HARQ processes for downlink (DL) SPS configured for the UE.

Example 67 is a UE, including the subject matter of examples 61-66, including or omitting elements, wherein the T-SRI field comprises a 2-bit field comprising an SPS release indicator value that identifies the total number of reserved bits for SPS PDSCH release(s) in accordance with a predefined mapping between the SPS release indicator value and the total number of reserved bits for SPS PDSCH release(s).

Example 68 is a UE, including the subject matter of examples 61-67, including or omitting elements, wherein the one or more reserved bits for SPS PDSCH release(s) are appended at the end of the Type-3 HARQ-ACK feedback signal.

Example 69 is a UE, including the subject matter of examples 61-68, including or omitting elements, wherein the one or more reserved bits for SPS PDSCH release(s) are appended at the start of the Type-3 HARQ-ACK feedback signal.

Example 70 is a UE, including the subject matter of examples 61-69, including or omitting elements, wherein the one or more HARQ-ACK bits for SPS PDSCH release(s) corresponds to bit positions associated with HARQ processes of the corresponding SPS PDSCH within the Type-3 HARQ-ACK feedback signal.

Example 71 is a UE, including the subject matter of examples 61-70, including or omitting elements, wherein the one or more HARQ-ACK bits for SPS PDSCH release(s) corresponds to a bit position associated with a HARQ process identified by a HARQ process identifier (HPI), wherein the HPI is indicated to the UE by radio resource control (RRC) signaling.

Example 72 is a base station (BS) comprising a processor (or processing circuitry) configured to perform operations comprising sending a downlink control information (DCI) to a user equipment (UE) associated therewith, wherein the DCI comprises an indication to the UE to trigger a Type-3 hybrid automatic repeat request (HARQ) acknowledgement (ACK) feedback signal; and receiving the Type-3 HARQ ACK feedback signal from the UE, in response to providing the DCI, wherein the Type-3 HARQ ACK feedback signal comprises one or more HARQ-ACK bits for semi-persistent scheduling (SPS) physical downlink shared channel (PDSCH) release(s) and wherein each of the one or more HARQ-ACK bits for SPS PDSCH release(s) is adapted to include HARQ-ACK information for an SPS PDSCH release associated with the UE.

Example 73 is a BS, including the subject matter of example 72, wherein the one or more HARQ-ACK bits for SPS PDSCH release(s) comprises one or more reserved bits that are reserved to include HARQ-ACK information for one or more SPS PDSCH release(s), respectively.

Example 74 is a BS, including the subject matter of examples 72-73, including or omitting elements, wherein the DCI further includes information of the number of reserved bits comprising the one or more reserved bits for SPS PDSCH release(s) that are to be included in the Type-3 HARQ ACK feedback signal.

Example 75 is a BS, including the subject matter of examples 72-74, including or omitting elements, wherein the DCI further includes a total SPS release indicator (T-SRI) field comprising information that enables to identify a total number of reserved bits comprising the one or more reserved bits for SPS PDSCH release(s) that are to be included within the Type-3 HARQ ACK feedback signal.

Example 76 is a BS, including the subject matter of examples 72-75, including or omitting elements, wherein the T-SRI field comprises a 1-bit field comprising an SPS release indicator value that indicates whether reserved bits for SPS PDSCH release(s) are included in Type-3 HARQ ACK feedback signal or not.

Example 77 is a BS, including the subject matter of examples 72-76, including or omitting elements, wherein the T-SRI field comprises a 2-bit field comprising an SPS release indicator value that identifies the total number of reserved bits for SPS PDSCH release(s) in accordance with a predefined mapping between the SPS release indicator value and the total number of reserved bits for SPS PDSCH release(s).

Example 78 is a BS, including the subject matter of examples 72-77, including or omitting elements, wherein the one or more reserved bits for SPS PDSCH release(s) are appended at the end of the Type-3 HARQ-ACK feedback signal.

Example 79 is a BS, including the subject matter of examples 72-78, including or omitting elements, wherein the one or more reserved bits for SPS PDSCH release(s) are appended at the start of the Type-3 HARQ-ACK feedback signal.

Example 80 is a BS, including the subject matter of examples 72-79, including or omitting elements, wherein the one or more HARQ-ACK bits for SPS PDSCH release(s) corresponds to bit positions associated with HARQ processes of the corresponding SPS PDSCH within the Type-3 HARQ-ACK feedback signal.

Example 81 is a BS, including the subject matter of examples 72-80, including or omitting elements, wherein the one or more HARQ-ACK bits for SPS PDSCH release(s) corresponds to a bit position associated with a HARQ process identified by a predefined HARQ process identifier (HPI), wherein the HPI is indicated to the UE by radio resource control (RRC) signaling.

Example 82 is a baseband (BB) processor for a UE configured to perform operations comprising receiving a downlink control information (DCI) from a base station associated therewith, wherein the DCI comprises an indication to trigger a Type-3 hybrid automatic repeat request (HARQ) acknowledgement (ACK) feedback signal; generating the Type-3 HARQ ACK feedback signal, based on processing the DCI, wherein the Type-3 HARQ ACK feedback signal comprises one or more HARQ-ACK bits for semi-persistent scheduling (SPS) physical downlink shared channel (PDSCH) release(s) and wherein each of the one or more HARQ-ACK bits for SPS PDSCH release(s) is adapted to include HARQ-ACK information for an SPS PDSCH release associated with the UE; and sending the Type-3 HARQ-ACK feedback signal to the base station.

Example 83 is a BB processor, including the subject matter of example 82, wherein the one or more HARQ-ACK bits for SPS PDSCH release(s) comprises one or more reserved bits that are reserved to include HARQ-ACK information for one or more SPS PDSCH release(s), respectively.

Example 84 is a BB processor, including the subject matter of examples 82-83, including or omitting elements, wherein the DCI further includes information of the number of reserved bits comprising the one or more reserved bits for SPS PDSCH release(s) that are to be included in the Type-3 HARQ-ACK feedback signal.

Example 85 is a BB processor, including the subject matter of examples 82-84, including or omitting elements, wherein the DCI further includes a total SPS release indicator (T-SRI) field comprising information that enables to identify a total number of reserved bits comprising the one or more reserved bits for SPS PDSCH release(s) that are to be included within the Type-3 HARQ ACK feedback signal.

Example 86 is a BB processor, including the subject matter of examples 82-85, including or omitting elements, wherein the T-SRI field comprises a 1-bit field comprising an SPS release indicator value that indicates whether reserved bits for SPS PDSCH release(s) are included in Type-3 HARQ ACK feedback signal or not.

Example 87 is a BB processor, including the subject matter of examples 82-86, including or omitting elements, wherein, when the SPS release indicator value indicates that the reserved bits for SPS PDSCH release(s) are included, the total number of reserved bits is determined based on a total number of HARQ processes for downlink (DL) SPS configured for the UE.

Example 88 is a BB processor, including the subject matter of examples 82-87, including or omitting elements, wherein the T-SRI field comprises a 2-bit field comprising an SPS release indicator value that identifies the total number of reserved bits for SPS PDSCH release(s) in accordance with a predefined mapping between the SPS release indicator value and the total number of reserved bits for SPS PDSCH release(s).

Example 89 is a BB processor, including the subject matter of examples 82-88, including or omitting elements, wherein the one or more reserved bits for SPS PDSCH release(s) are appended at the end of the Type-3 HARQ-ACK feedback signal.

Example 90 is a BB processor, including the subject matter of examples 82-89, including or omitting elements, wherein the one or more reserved bits for SPS PDSCH release(s) are appended at the start of the Type-3 HARQ-ACK feedback signal.

Example 91 is a BB processor, including the subject matter of examples 82-90, including or omitting elements, wherein the one or more HARQ-ACK bits for SPS PDSCH release(s) corresponds to bit positions associated with HARQ processes of the corresponding SPS PDSCH within the Type-3 HARQ-ACK feedback signal.

Example 92 is a BB processor, including the subject matter of examples 82-91, including or omitting elements, wherein the one or more HARQ-ACK bits for SPS PDSCH release(s) corresponds to a bit position associated with a HARQ process identified by a HARQ process identifier (HPI), wherein the HPI is indicated to the UE by radio resource control (RRC) signaling.

Example 93 is a baseband (BB) processor for a base station configured to perform operations comprising sending a downlink control information (DCI) to a user equipment (UE) associated therewith, wherein the DCI comprises an indication to the UE to trigger a Type-3 hybrid automatic repeat request (HARQ) acknowledgement (ACK) feedback signal; and receiving the Type-3 HARQ ACK feedback signal from the UE, in response to providing the DCI, wherein the Type-3 HARQ ACK feedback signal comprises one or more HARQ-ACK bits for semi-persistent scheduling (SPS) physical downlink shared channel (PDSCH) release(s) and wherein each of the one or more HARQ-ACK bits for SPS PDSCH release(s) is adapted to include HARQ-ACK information for an SPS PDSCH release associated with the UE.

Example 94 is a BB processor, including the subject matter of example 93, wherein the one or more HARQ-ACK bits for SPS PDSCH release(s) comprises one or more reserved bits that are reserved to include HARQ-ACK information for one or more SPS PDSCH release(s), respectively.

Example 95 is a BB processor, including the subject matter of examples 93-94, including or omitting elements, wherein the DCI further includes information of the number of reserved bits comprising the one or more reserved bits for SPS PDSCH release(s) that are to be included in the Type-3 HARQ ACK feedback signal.

Example 96 is a BB processor, including the subject matter of examples 93-95, including or omitting elements, wherein the DCI further includes a total SPS release indicator (T-SRI) field comprising information that enables to identify a total number of reserved bits comprising the one or more reserved bits for SPS PDSCH release(s) that are to be included within the Type-3 HARQ ACK feedback signal.

Example 97 is a BB processor, including the subject matter of examples 93-96, including or omitting elements, wherein the T-SRI field comprises a 1-bit field comprising an SPS release indicator value that indicates whether reserved bits for SPS PDSCH release(s) are included in Type-3 HARQ ACK feedback signal or not.

Example 98 is a BB processor, including the subject matter of examples 93-97, including or omitting elements, wherein the T-SRI field comprises a 2-bit field comprising an SPS release indicator value that identifies the total number of reserved bits for SPS PDSCH release(s) in accordance with a predefined mapping between the SPS release indicator value and the total number of reserved bits for SPS PDSCH release(s).

Example 99 is a BB processor, including the subject matter of examples 93-98, including or omitting elements, wherein the one or more reserved bits for SPS PDSCH release(s) are appended at the end of the Type-3 HARQ-ACK feedback signal.

Example 100 is a BB processor, including the subject matter of examples 93-99, including or omitting elements, wherein the one or more reserved bits for SPS PDSCH release(s) are appended at the start of the Type-3 HARQ-ACK feedback signal.

Example 101 is a BB processor, including the subject matter of examples 93-100, including or omitting elements, wherein the one or more HARQ-ACK bits for SPS PDSCH release(s) corresponds to bit positions associated with HARQ processes of the corresponding SPS PDSCH within the Type-3 HARQ-ACK feedback signal.

Example 102 is a BB processor, including the subject matter of examples 93-101, including or omitting elements, wherein the one or more HARQ-ACK bits for SPS PDSCH release(s) corresponds to a bit position associated with a HARQ process identified by a predefined HARQ process identifier (HPI), wherein the HPI is indicated to the UE by radio resource control (RRC) signaling.

Example 103 is a method for a user equipment (UE) comprising receiving a downlink control information (DCI) from a base station associated therewith, using one or more processors, wherein the DCI comprises an indication to trigger a Type-3 hybrid automatic repeat request (HARQ) acknowledgement (ACK) feedback signal; generating the Type-3 HARQ ACK feedback signal, based on processing the DCI, using the one or more processors, wherein the Type-3 HARQ ACK feedback signal comprises one or more HARQ-ACK bits for semi-persistent scheduling (SPS) physical downlink shared channel (PDSCH) release(s) and wherein each of the one or more HARQ-ACK bits for SPS PDSCH release(s) is adapted to include HARQ-ACK information for an SPS PDSCH release associated with the UE; and sending the Type-3 HARQ-ACK feedback signal to the base station, using the one or more processors.

Example 104 is a method, including the subject matter of example 103, wherein the one or more HARQ-ACK bits for SPS PDSCH release(s) comprises one or more reserved bits that are reserved to include HARQ-ACK information for one or more SPS PDSCH release(s), respectively.

Example 105 is a method, including the subject matter of examples 103-104, including or omitting elements, wherein the DCI further includes information of the number of reserved bits comprising the one or more reserved bits for SPS PDSCH release(s) that are to be included in the Type-3 HARQ-ACK feedback signal.

Example 106 is a method, including the subject matter of examples 103-105, including or omitting elements, wherein the DCI further includes a total SPS release indicator (T-SRI) field comprising information that enables to identify a total number of reserved bits comprising the one or more reserved bits for SPS PDSCH release(s) that are to be included within the Type-3 HARQ ACK feedback signal.

Example 107 is a method, including the subject matter of examples 103-106, including or omitting elements, wherein the T-SRI field comprises a 1-bit field comprising an SPS release indicator value that indicates whether reserved bits for SPS PDSCH release(s) are included in Type-3 HARQ ACK feedback signal or not.

Example 108 is a method, including the subject matter of examples 103-107, including or omitting elements, wherein, when the SPS release indicator value indicates that the reserved bits for SPS PDSCH release(s) are included, the total number of reserved bits is determined based on a total number of HARQ processes for downlink (DL) SPS configured for the UE.

Example 109 is a method, including the subject matter of examples 103-108, including or omitting elements, wherein the T-SRI field comprises a 2-bit field comprising an SPS release indicator value that identifies the total number of reserved bits for SPS PDSCH release(s) in accordance with a predefined mapping between the SPS release indicator value and the total number of reserved bits for SPS PDSCH release(s).

Example 110 is a method, including the subject matter of examples 103-109, including or omitting elements, wherein the one or more reserved bits for SPS PDSCH release(s) are appended at the end of the Type-3 HARQ-ACK feedback signal.

Example 111 is a method, including the subject matter of examples 103-110, including or omitting elements, wherein the one or more reserved bits for SPS PDSCH release(s) are appended at the start of the Type-3 HARQ-ACK feedback signal.

Example 112 is a method, including the subject matter of examples 103-111, including or omitting elements, wherein the one or more HARQ-ACK bits for SPS PDSCH release(s) corresponds to bit positions associated with HARQ processes of the corresponding SPS PDSCH within the Type-3 HARQ-ACK feedback signal.

Example 113 is a method, including the subject matter of examples 103-112, including or omitting elements, wherein the one or more HARQ-ACK bits for SPS PDSCH release(s) corresponds to a bit position associated with a HARQ process identified by a HARQ process identifier (HPI), wherein the HPI is indicated to the UE by radio resource control (RRC) signaling.

Example 114 is a method for a base station comprising sending a downlink control information (DCI) to a user equipment (UE) associated therewith, using one or more processors, wherein the DCI comprises an indication to the UE to trigger a Type-3 hybrid automatic repeat request (HARQ) acknowledgement (ACK) feedback signal; and receiving the Type-3 HARQ ACK feedback signal from the UE, in response to providing the DCI, using the one or more processors, wherein the Type-3 HARQ ACK feedback signal comprises one or more HARQ-ACK bits for semi-persistent scheduling (SPS) physical downlink shared channel (PDSCH) release(s) and wherein each of the one or more HARQ-ACK bits for SPS PDSCH release(s) is adapted to include HARQ-ACK information for an SPS PDSCH release associated with the UE.

Example 115 is a method, including the subject matter of example 114, wherein the one or more HARQ-ACK bits for SPS PDSCH release(s) comprises one or more reserved bits that are reserved to include HARQ-ACK information for one or more SPS PDSCH release(s), respectively.

Example 116 is a method, including the subject matter of examples 113-114, including or omitting elements, wherein the DCI further includes information of the number of reserved bits comprising the one or more reserved bits for SPS PDSCH release(s) that are to be included in the Type-3 HARQ ACK feedback signal.

Example 117 is a method, including the subject matter of examples 113-116, including or omitting elements, wherein the DCI further includes a total SPS release indicator (T-SRI) field comprising information that enables to identify a total number of reserved bits comprising the one or more reserved bits for SPS PDSCH release(s) that are to be included within the Type-3 HARQ ACK feedback signal.

Example 118 is a method, including the subject matter of examples 113-117, including or omitting elements, wherein the T-SRI field comprises a 1-bit field comprising an SPS release indicator value that indicates whether reserved bits for SPS PDSCH release(s) are included in Type-3 HARQ ACK feedback signal or not.

Example 119 is a method, including the subject matter of examples 113-118, including or omitting elements, wherein the T-SRI field comprises a 2-bit field comprising an SPS release indicator value that identifies the total number of reserved bits for SPS PDSCH release(s) in accordance with a predefined mapping between the SPS release indicator value and the total number of reserved bits for SPS PDSCH release(s).

Example 120 is a method, including the subject matter of examples 113-119, including or omitting elements, wherein the one or more reserved bits for SPS PDSCH release(s) are appended at the end of the Type-3 HARQ-ACK feedback signal.

Example 121 is a method, including the subject matter of examples 113-120, including or omitting elements, wherein the one or more reserved bits for SPS PDSCH release(s) are appended at the start of the Type-3 HARQ-ACK feedback signal.

Example 122 is a method, including the subject matter of examples 113-121, including or omitting elements, wherein the one or more HARQ-ACK bits for SPS PDSCH release(s) corresponds to bit positions associated with HARQ processes of the corresponding SPS PDSCH within the Type-3 HARQ-ACK feedback signal.

Example 123 is a method, including the subject matter of examples 113-122, including or omitting elements, wherein the one or more HARQ-ACK bits for SPS PDSCH release(s) corresponds to a bit position associated with a HARQ process identified by a predefined HARQ process identifier (HPI), wherein the HPI is indicated to the UE by radio resource control (RRC) signaling.

Example 124 is a UE, including the subject matter of examples 1-10, including or omitting elements, wherein the HARQ-ACK feedback signal triggered by the DCI comprises a Type-1 HARQ-ACK codebook.

Example 125 is a UE, including the subject matter of examples 1-10, including or omitting elements, wherein the HARQ-ACK feedback signal triggered by the DCI comprises a Type-3 HARQ-ACK codebook.

Example 126 is a BS, including the subject matter of examples 11-20, including or omitting elements, wherein the HARQ-ACK feedback signal triggered by the DCI comprises a Type-1 HARQ-ACK codebook.

Example 127 is a BS, including the subject matter of examples 11-20, including or omitting elements, wherein the HARQ-ACK feedback signal triggered by the DCI comprises a Type-3 HARQ-ACK codebook.

Example 128 is a UE, including the subject matter of examples 61-71, including or omitting elements, wherein the operations further comprise determining whether the Type-3 HARQ-ACK feedback signal and HARQ-ACK information associated with an SPS PDSCH release are to be send to the base station at a same slot, prior to generating the Type-3 HARQ ACK feedback signal and including the HARQ-ACK information corresponding to the SPS PDSCH release in a HARQ-ACK bit of the one or more HARQ-ACK bits for SPS PDSCH release(s) within the Type-3 HARQ-ACK feedback signal, based on the determination.

Example 129 is a BB processor, including the subject matter of examples 82-92, including or omitting elements, wherein the operations further comprise determining whether the Type-3 HARQ-ACK feedback signal and HARQ-ACK information associated with an SPS PDSCH release are to be send to the base station at a same slot, prior to generating the Type-3 HARQ ACK feedback signal and including the HARQ-ACK information corresponding to the SPS PDSCH release in a HARQ-ACK bit of the one or more HARQ-ACK bits for SPS PDSCH release(s) within the Type-3 HARQ-ACK feedback signal, based on the determination.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A baseband processor for a user equipment (UE), configured to:
   receive, from a base station, configuration of a plurality of hybrid automatic repeat request (HARQ) process groups (HPGs), each HPG of the plurality of HPGs comprising one or more HARQ processes for physical downlink shared channel (PDSCH);
   receive, from the base station, a downlink control information (DCI), wherein the DCI indicates one or more HPGs of the plurality of HPGs; and
   triggered by the DCI and based on the one or more HPGs, generate a HARQ-ACK feedback signal for transmission to the base station.

2. The baseband processor of claim 1, wherein the HARQ-ACK feedback signal is triggered on demand by a one-shot HARQ-ACK request field in the DCI.

3. The baseband processor of claim 1, wherein the DCI comprises an HPG request field value that identifies the one or more HPGs based on a predefined mapping between the HPG request field value and the one or more HPGs.

4. The baseband processor of claim 1, wherein the DCI comprises cyclic redundancy check (CRC) bits that are scrambled by a predefined HPG sequence, wherein the predefined HPG sequence identifies the one or more HPGs, and wherein the CRC bits are descrambled to determine the predefined HPG sequence and the one or more HPGs based on the predefined HPG sequence, in accordance with a predefined mapping between the predefined HPG sequence and the one or more HPGs.

5. The baseband processor of claim 1, wherein the DCI indicates a priority class index, wherein the priority class index identifies the one or more HPGs.

6. The baseband processor of claim 1, wherein the HARQ-ACK feedback signal further includes a latest new data indicator (NDI) value detected by the UE for each of the one or more HARQ processes associated with the one or more HPGs.

7. The baseband processor of claim 6, wherein the operations further comprise receiving an NDI configuration signal from the base station, wherein the NDI configuration signal is adapted to configure the UE to include the NDI as part of the HARQ-ACK feedback signal.

8. The baseband processor of claim 1, wherein the operations further comprise receiving a HARQ process regrouping signal from the base station, wherein the HARQ process regrouping signal comprises information to regroup the one or more HARQ processes associated with one or more HPGs of the plurality of HPGs.

9. The baseband processor of claim 8, wherein the HARQ process regrouping signal comprises one or more HARQ regroup media access control (MAC) control elements (CEs), wherein each HARQ regroup MAC CE of the one or more HARQ regroup MAC CEs is associated with an HPG identifier (ID) of a select HPG of the plurality of HPGs, wherein each HARQ regroup MAC CE of the one or more HARQ regroup MAC CEs comprises a set of H-fields that corresponds to the set of HARQ processes configured for the UE, and wherein a value associated with each H-field of the set of H-fields identifies one or more HARQ processes that are included within the select HPG identified by the HPGID.

10. The BB baseband processor of claim 8, wherein the HARQ process regrouping signal comprises a HARQ regroup media access control (MAC) control element (CE)

comprising one or more sets of H-fields respectively associated with the one or more HPGs of the plurality of HPGs, wherein each set of H-fields of the one or more sets of H-fields correspond to the set of HARQ processes configured for the UE and wherein a value associated with each H-field of the set of H-fields identifies one or more HARQ processes that are included within a respective HPG.

11. The baseband processor of claim 1, wherein the HARQ-ACK feedback signal comprises a Type-1 HARQ-ACK codebook.

12. The baseband processor of claim 1, wherein the HARQ-ACK feedback signal comprises a Type-3 HARQ-ACK codebook.

13. A base station configured to perform operations comprising:
sending a hybrid automatic repeat request (HARQ) process group (HPG) configuration signal to a user equipment (UE), wherein the HPG configuration signal configures a plurality of HPGs, each HPG of the plurality of HPGs comprising one or more HARQ processes for physical downlink shared channel (PDSCH);
sending a downlink control information (DCI) to the UE, wherein the DCI is configured to trigger a HARQ-ACK feedback signal from the UE and indicates one or more HPGs of the plurality of HPGs; and
receiving the HARQ-ACK feedback signal from the UE, wherein the HARQ-ACK feedback signal comprises HARQ-ACK feedback information of HARQ processes associated with the one or more HPGs.

14. The base station of claim 13, wherein the plurality of HPGs are respectively associated with a plurality of priority class indices, wherein each priority class index of the plurality of priority class indices corresponds to a priority index associated with the one or more HARQ processes of the respective HPG.

15. The base station of claim 13, wherein the DCI comprises an HPG request field value that identifies the one or more HPGs based on a predefined mapping between the HPG request field value and the one or more HPGs.

16. The base station of claim 13, wherein the DCI comprises cyclic redundancy check (CRC) bits that are scrambled by a predefined HPG sequence, wherein the predefined HPG sequence identifies the one or more HPGs in accordance with a predefined mapping between the predefined HPG sequence and the one or more HPGs.

17. The base station of claim 13, wherein the DCI comprises a priority class index, wherein the priority class index identifies the one or more HPGs.

18. A method, comprising:
receiving, from a base station, configuration of a plurality of hybrid automatic repeat request (HARQ) process groups (HPGs), each HPG of the plurality of HPGs comprising one or more HARQ processes of a set of HARQ processes configured for the UE for physical downlink shared channel (PDSCH);
receiving a downlink control information (DCI) from the base station, wherein the DCI is configured to trigger a HARQ-ACK feedback signal from the UE and wherein the DCI indicates one or more HPGs of the plurality of HPGs;
generating the HARQ-ACK feedback signal comprising HARQ-ACK feedback information of HARQ processes associated with the one or more HPGs; and
sending the HARQ-ACK feedback signal to the base station.

19. The method of claim 18, wherein the plurality of HPGs are respectively associated with a plurality of priority class indices, wherein each priority class index of the plurality of priority class indices corresponds to a priority index associated with the one or more HARQ processes of the respective HPG.

20. The method of claim 18, wherein the DCI comprises an HPG request field value that identifies the one or more HPGs and wherein the one or more HPGs is determined based on a predefined mapping between the HPG request field value and the one or more HPGs.

* * * * *